United States Patent
Mizuno et al.

(10) Patent No.: US 7,775,133 B2
(45) Date of Patent: Aug. 17, 2010

(54) VEHICLE TRANSMISSION

(75) Inventors: Kinya Mizuno, Saitama (JP); Hiroshi Sotani, Saitama (JP); Seiji Hamaoka, Saitami (JP); Eiji Kittaka, Saitama (JP); Kazuhiro Yasuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 12/043,646

(22) Filed: Mar. 6, 2008

(65) Prior Publication Data
US 2008/0229854 A1    Sep. 25, 2008

(30) Foreign Application Priority Data
Mar. 22, 2007    (JP) .............................. 2007-074581

(51) Int. Cl.
*F16H 3/08*    (2006.01)
*F16H 59/00*    (2006.01)
(52) U.S. Cl. ...................................... 74/330; 74/337.5
(58) Field of Classification Search ................... 74/330, 74/331, 337.5
See application file for complete search history.

(56) References Cited

U.S. PATENT DOCUMENTS

2007/0199392 A1 * 8/2007 Mizuno et al. ................ 74/325
2008/0023291 A1 * 1/2008 Sorani et al. ................ 192/87.1
2008/0220936 A1 * 9/2008 Kobayashi et al. ............ 477/70
2008/0236316 A1 * 10/2008 Mizuno et al. ................ 74/335
2009/0025498 A1 * 1/2009 Sotani et al. ................ 74/404

FOREIGN PATENT DOCUMENTS

| EP | 0 900 722 A2 | 3/1999 |
| EP | 1 707 483 A1 | 10/2006 |
| JP | 2005-273829 A | 10/2005 |

* cited by examiner

*Primary Examiner*—Dirk Wright
(74) *Attorney, Agent, or Firm*—Birch, Stewart, Kolasch & Birch, LLP

(57) ABSTRACT

A vehicle transmission includes first and second main shafts that enable switching of power transmission from an engine; a counter shaft connected to a drive wheel; and gear trains with a plurality of shift stages provided between each of the first and second main shafts and the counter shaft. The vehicle transmission also includes shifters which switch between engagement with and disengagement from a gear constituting part of each of the gear trains so as to switch the established states of the gear trains, and to prevent, during running at the most frequently used shift stage, the occurrence of gear rattle produced by a gear train other than the gear train with such a shift stage. With this configuration, in the running state of using a particular gear train with the highest frequency of the established states among the gear trains, the gear trains, excluding the particular gear train, are in the non-established state.

20 Claims, 11 Drawing Sheets

VEHICLE TRANSMISSION

CROSS-REFERENCE TO RELATED APPLICATION

The present application claims priority under 35 U.S.C. §119 to Japanese Patent Application No. 2007-074581, filed Mar. 22, 2007, the entire contents of which are hereby incorporated by reference.

BACKGROUND OF THE INVENTION

1. Field of the Invention

The present invention relates to a vehicle transmission that includes first and second main shafts that enable switching of power transmission from an engine; a counter shaft connected to a drive wheel; gear trains with a plurality of shift stages provided between each of the first and second main shafts and the counter shaft; and shifters which switch between engagement with and disengagement front a gear constituting part of each of the gear trains so as to switch the established states of the gear trains.

2. Description of Background Art

Japanese Patent Laid-open No. 2005-273829 discloses a vehicle transmission in which gear trains with a plurality of shift stages are provided between a pair of main shafts and a counter shaft, and when a gear train is established that is provided between the counter shaft and one of the main shafts that receives power transmitted thereto from an engine, also a gear train provided between the counter shaft and the other main shaft that does not receive power transmitted thereto from the engine is established for preliminary shift.

However, in the vehicle transmission configured as disclosed in Japanese Patent Laid-open No. 2005-273829, also a fourth-speed gear train is established during running at a high-frequently used shift stage, e.g., a fifth-speed, so that a shifter is engaged with a gear constituting part of a fourth-speed gear train. Consequently, gear rattle will occur at a gear on the fourth-speed gear train side.

SUMMARY AND OBJECTS OF THE INVENTION

The present invention has been made in view of the foregoing and it is an object of the present invention to provide a vehicle transmission in which during running at the most frequently used shift stage occurrence of gear rattle produced by a gear train other than the gear train with such a shift stage can be prevented.

To achieve the above object, according to an embodiment of the present invention, a vehicle transmission includes: first and second main shafts that enable switching of power transmission from an engine, and a counter shaft connected to a drive wheel. In addition, gear trains with a plurality of shift stages are provided between each of the first and second main shafts and the counter shaft. Further, shifters are provided which switch between engagement with and disengagement from a gear constituting part of each of the gear trains so as to switch the established states of the gear trains. In a running state of using a particular gear train with the highest frequency of an established state among the gear trains, the gear trains excluding the particular gear train are in the non-established state.

In additions according to an embodiment of the present invention, the shift drum in which shift positions of a plurality of shift stages are set to be circumferentially spaced from each other is provided on an outer circumference thereof with lead grooves adapted to receive respective shift forks slidably engaged therewith, the shift forks holding the respective shifters. The shift position for highest shift stage that establishes only the particular gear train corresponding to the highest shift stage and a common shift position that establishes both the particular gear train and a lower speed stage side gear train corresponding to a shift stage lower, by one stage, than the highest shift stage are set adjacently to each other in the circumferential direction of the shift drum.

Further according to an embodiment of the present invention, a first clutch is provided between the engine and the first main shaft, a second clutch is provided between the engine and the second main shaft, the particular gear train is provided between the first main shaft and the counter shaft, and the low-speed stage side gear train is provided between the second main shaft and the counter shaft. In addition, a control unit is provided which controls operation of drive means turning the shift drum and engagement/disengagement switching of the first and second hydraulic clutches, at the time of upshift from a state of running at a shift stage lower, by one stage, than the highest shift stage by disengagement of the first hydraulic clutch and by engagement of the second hydraulic clutch. The control unit allows the shift drum to be turned to a shift position for highest shift stage to release the establishment of the lower-speed side gear train during running at the highest shift stage resulting from the engagement of the first hydraulic clutch and from the disengagement of the second hydraulic clutch. At the time of downshift from running at the highest shift stage in the state of the engagement of the first clutch and of the disengagement of the second clutch, the control unit allows the shift drum to turn to the common shift position to establish both the low-speed stage side gear train and the particular gear train, then disengages the first clutch and engages the second clutch.

It is to be noted that the fourth-speed gear train G4 of the embodiment corresponds to the low-speed stage side gear train of the present invention. The fifth-speed gear train G5 of the embodiment corresponds to the particular gear train of the present invention. The fifth-speed position $P_5$ of the embodiment corresponds to the shift position for highest shift stage of the present invention. The fourth- and fifth-speed position $P_{4-5}$ of the embodiment corresponds to the common shift position of the present invention.

Effects of the Invention Include the Following:

According to the embodiment of the present invention described above, at the time of running at the most frequently used shift stage, the gear trains other than the gear train corresponding to such a shift stage are in the non-established state. Therefore, during running at the most frequently used shift stage, occurrence of gear rattle produced by the gear train other than the gear train with such a shift stage can be prevented.

According to the embodiment of the present invention described above, the shift position for highest shift stage that establishes only the particular gear train corresponding to the highest shift stage and the common shift position that establishes both the particular gear train and a lower speed stage side gear train corresponding to a shift stage lower, by one stage, than the highest shift stage are set adjacently to each other. Thus, with a simple configuration, during running at the highest shift stage, only the particular gear train corresponding to the highest shift stage can be established, and during running a shift stage lower, by one stage, than the highest shift stage, both the particular gear train corresponding to the highest shift stage and the lower-speed stage side gear train corresponding to the shift stage lower, by one stage, than the highest shift stage can be established.

According to an embodiment of the present invention, at the time of upshift from a state of running at a shift stage lower, by one stage, than the highest shift stage, the establishment of the lower-speed stage side gear train is released during running at the highest shift stage resulting from the engagement of the first clutch and from the disengagement of the second clutch, and at the time of downshift from running at the highest shift stage, both the lower-speed stage side gear train and the particular gear train are established and then the first clutch is disengaged and the second clutch is engaged, thereby providing running at the shift stage lower, by one stage, than the highest shift stage. Thus, the shift operation between the highest shift stage and the shift stage lower, by one stage, than the highest shift stage can be made satisfactory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is an enlarged cross-sectional view, corresponding to FIG. 6, in the second-speed driving state; and.

DETAILED DESCRIPTION OF THE PREFERRED EMBODIMENTS

Figure 1:
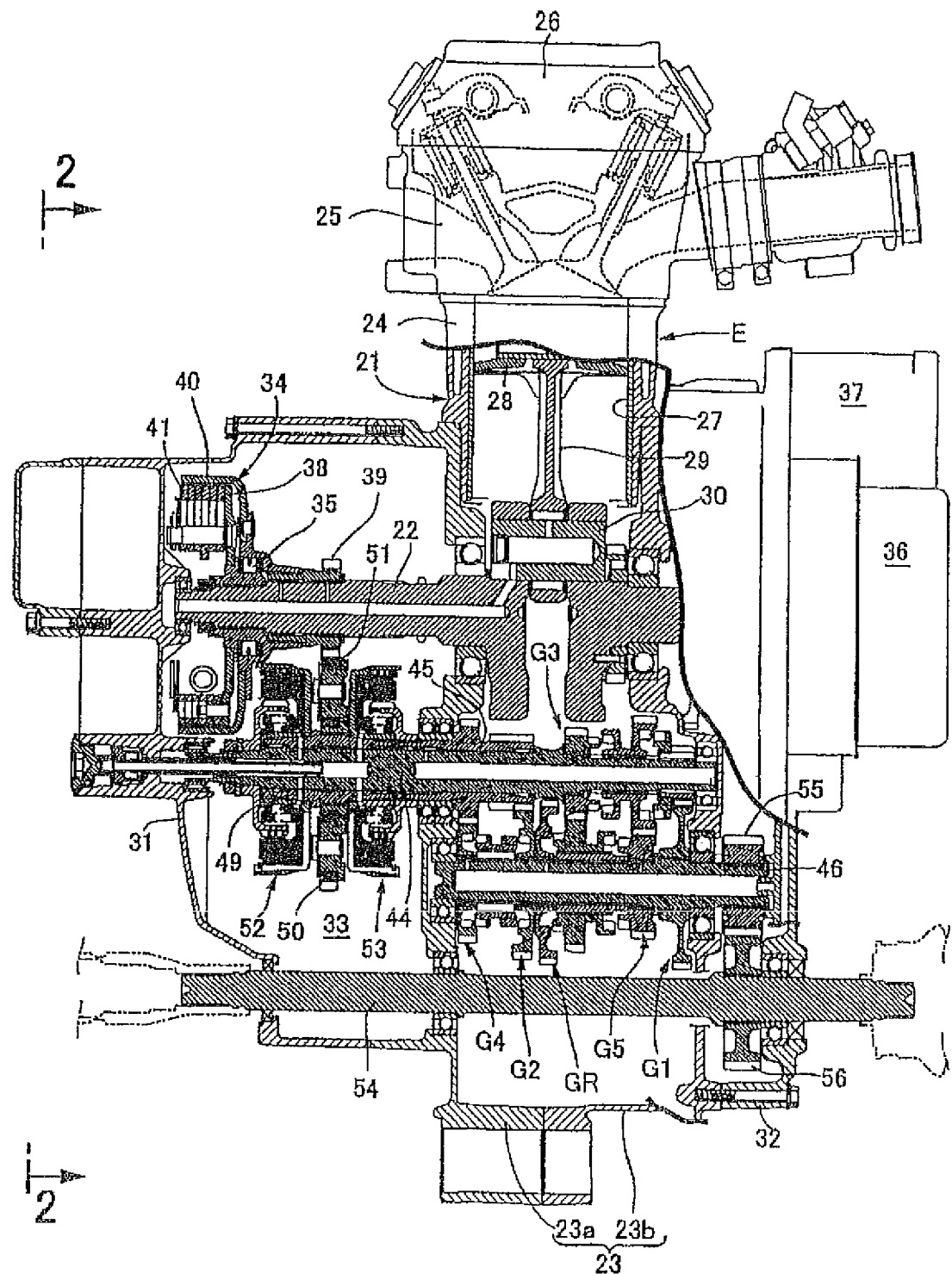
FIG. 1 is a longitudinal cross-sectional view of an engine main body, taken along line I-I of FIG. 2.

Referring first to FIG. 1, an engine main body 21 of an engine E mounted on e.g. an all terrain vehicle includes a crankcase 23, a cylinder block 24, a cylinder head 25, and a head cover 26. The crankcase 23 journals a crankshaft 22 having an axial line extending vehicle-widthwise (a direction parallel to the sheet surface of FIG. 1). The cylinder block 24 is joined to the upper portion of the crankcase 23. The cylinder head 25 is joined to the upper portion of the cylinder block 24. The head cover 26 is joined to the upper portion of the cylinder head 25. A piston 28 slidably fitted into the cylinder bore 27 of the cylinder block 24 is connected to the crankshaft 22 via a connecting rod 29 and via a connecting pin 30.

The crankcase 23 consists of a pair of case half bodies 23a, 23b joined together at a plane perpendicular to the rotational axis of the crankshaft 22. First and second crankcase covers 31, 32 are respectively fastened to both sides of the crankcase 23. A clutch housing chamber 33 is defined between the crankcase 23 and the first crankcase cover 31.

One end of the crankshaft 22 projecting from the crankcase 23 is journaled by the first crankcase cover 31. A centrifugal clutch 34 housed in the clutch housing chamber 33 is attached via a one-way clutch 35 to one end of the crankshaft 22 at a position close to the first crankcase cover 31. A generator (not shown) disposed between the crankcase cover 23 and the second crankcase case cover 32 and a recoil starter 36 attached to the second crankcase cover 32 are each connected to the other end of the crankshaft 22 extending from the crankcase 23. A starter motor 37 is attached to the second crankcase cover 32 in order to apply starting power to the crankshaft 22.

The centrifugal clutch 34 includes a drive plate 38 secured to the crankshaft 22; a bowl-like clutch housing 40; and a clutch weight 41. The clutch housing 40 coaxially covers the drive plate 38 so as to be rotated together with a drive gear 39 relatively rotatably carried on the crankshaft 22. The clutch weight 41 is rotatably supported by the drive plate 38 so as to enable frictional engagement with the inner circumference of the clutch housing 40 in response to action of a centrifugal force resulting from rotation of the crankshaft 22. The one-way clutch 35 is interposed between the clutch housing 40 and the drive plate 38 so as to enable power transmission from the drive shaft 39 to the crankshaft 22.

Figure 2:
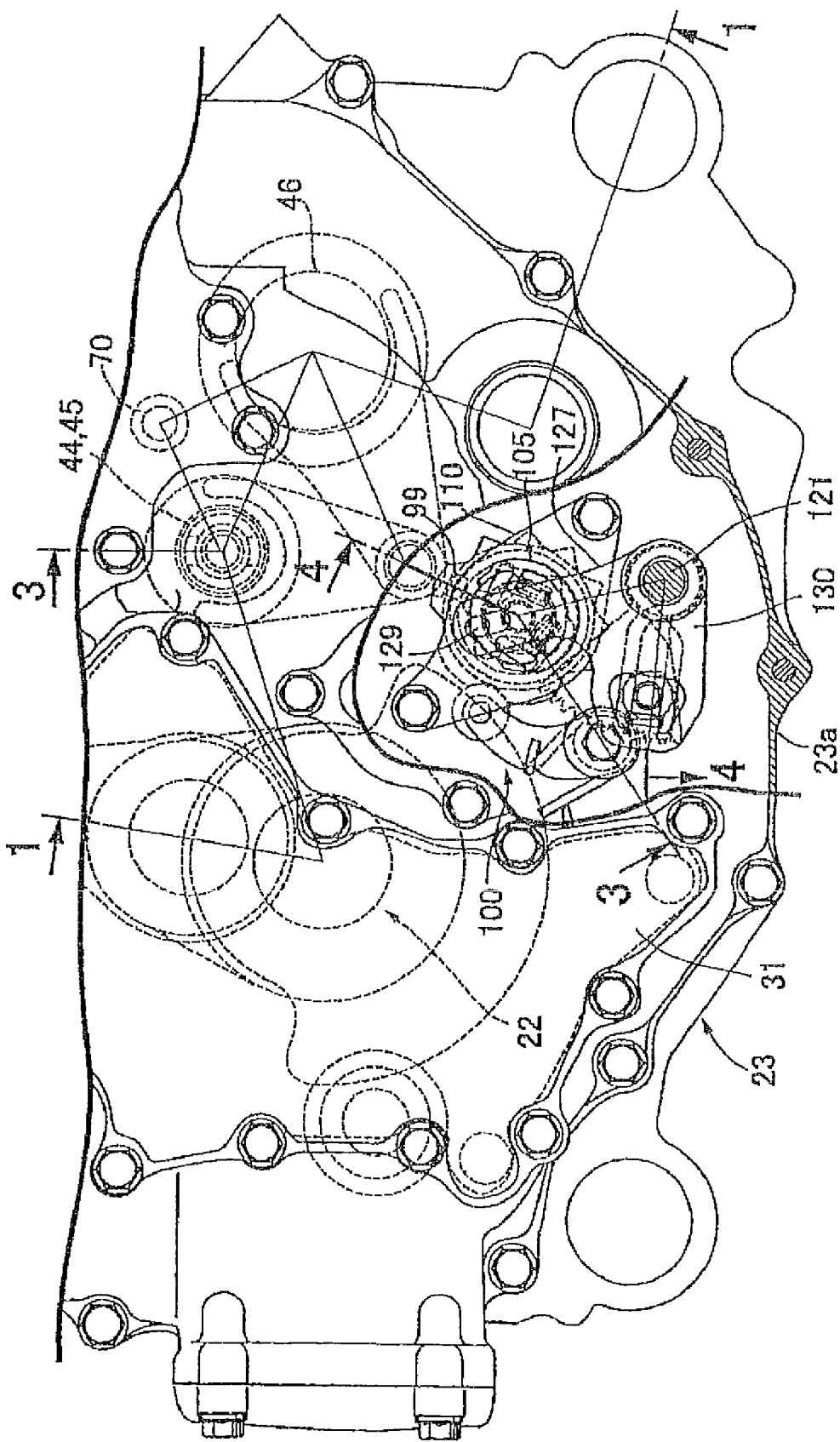
FIG. 2 is a partial cutaway lateral view as viewed from the arrow direction of line 2-2 of FIG. 1.
Figure 3:
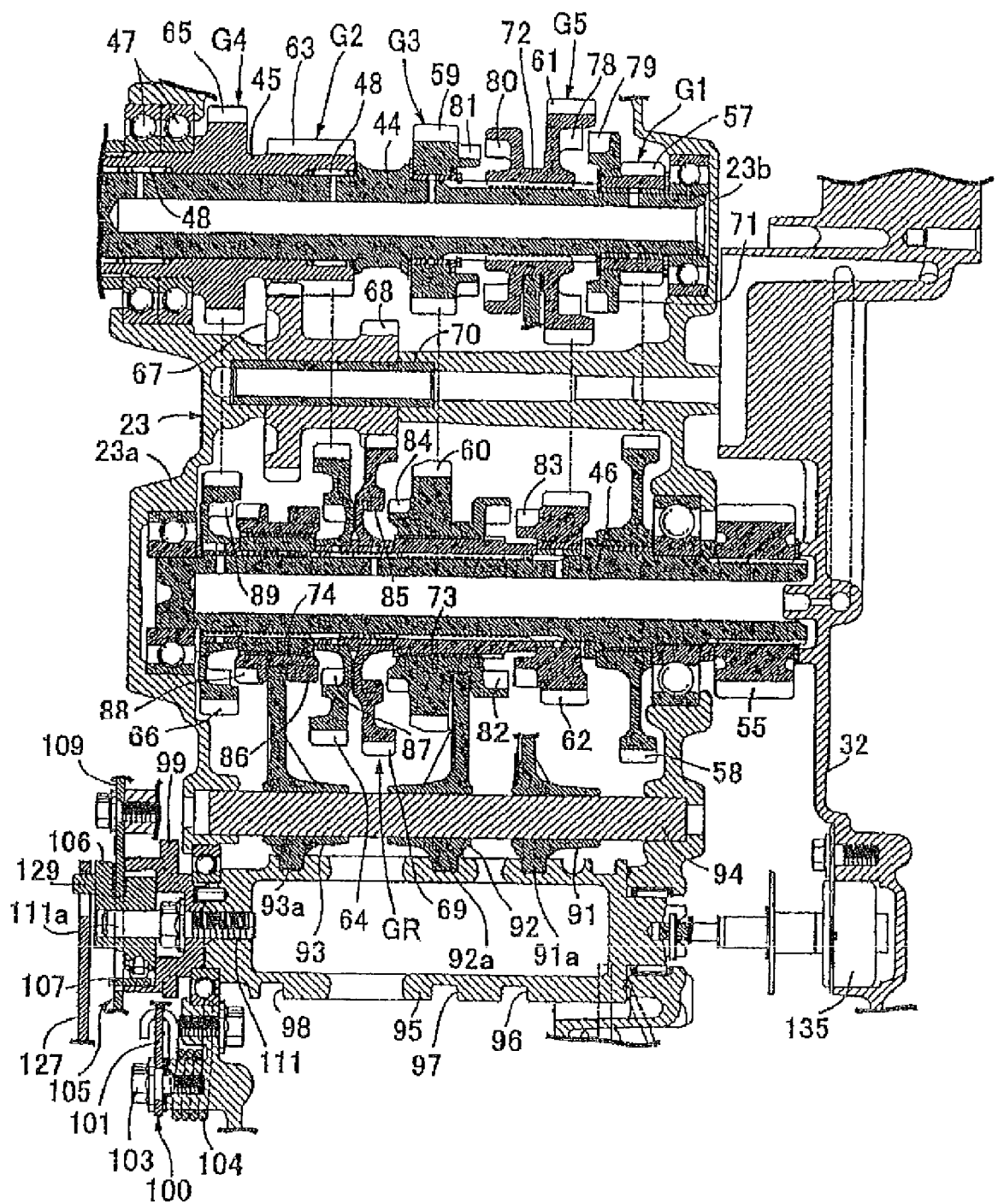
FIG. 3 is a cross-sectional view taken along line 3-3 of FIG. 2.

Referring additionally to FIGS. 2 and 3, first and second main shafts 44, 45 and a counter shaft 46 are journaled by the crankcase 23. The first and second main shafts 44, 45 are disposed coaxially with each other so as to enable relative rotation around one and the same axial line and to enable rotation around an axis parallel to the rotational axis of the crankshaft 22. The counter shaft 46 is parallel to the first and second main shafts 44, 45. Gear trains with a plurality of gear stages which can selectively be established are provided between the first and second main shafts 44, 45 and the counter shaft 46. In the embodiment, a first-speed gear train G1, a third-speed gear train G3 and a fifth-speed gear train G5 are provided between the first main shaft 44 and the counter shaft 46. A second-speed gear train G2, a fourth gear train G4 and a reverse gear train GR are provided between the second main shaft 45 and the counter shaft 46.

The first main shaft 44 coaxially passes through the second main shaft 45 for relative rotation which is journaled by the crankcase 23 via ball bearings 47, 47. A plurality of needle bearings 48 are interposed between the second main shaft 45 and the first main shaft 44.

A transmission cylindrical shaft 49 is relatively rotatably attached to the first main shaft 44 in the clutch housing chamber 33. Power is transmitted to the transmission cylindrical shaft 49 via the drive gear 39 attached to the crankshaft 22 for relative rotation, via a driven gear 50 meshing with the drive gear 30 and via a rubber damper 51. A first hydraulic clutch 52 is provided between the transmission cylindrical shaft 49 and the first main shaft 44 and a second hydraulic clutch 52 is provided between the transmission cylindrical shaft 49 and the second main shaft 45.

In this way, when the first hydraulic clutch 52 is in a power transmission state and power is transmitted from the crankshaft 22 to the first main shaft 44, power is transmitted from the first main shaft 44 to the counter shaft 46 via a gear train alternatively established among the first, third and fifth-speed gear trains G1, G3 and G5. When the second hydraulic clutch 53 is in a power transmission state and power is transmitted from the crankshaft 22 to the second main shaft 45, power is transmitted from the second main shaft 45 to the counter shaft 46 via a gear train alternatively established among the seconds fourth-speed and reverse gear trains G2, G4 and GR.

As shown in FIG. 1, the output shaft 54 connected to a drive wheel not shown and having an axis parallel to the rotational axis of the crankshaft 22 is journaled by the second crankcase cover 32 and by one case half body 23a of the crankcase 23. Both ends of the output shaft 54 liquid-tightly and rotatably pass through the first and second crankcase covers 31, 32, respectively, and project outward. On the other hand, a drive gear 55 is secured to the end of the counter shaft 46 projecting from the other case half body 23b of the crankcase 23. A driven gear 56 meshing with the drive gear 55 is carried by the output shaft 54. In short, the counter shaft 46 is connected to the drive wheel via the drive gear 55, via the driven gear 56 and via the output shaft 54.

Focusing on FIG. 3, the first-speed gear train G1 includes a first-speed drive idle gear 57 which is carried by the first main shaft for relative rotation with its axial position being constant; and a first-speed driven gear 58 which is joined to the counter shaft 46 so as not to be relatively rotatable and meshes with the first-speed drive idle gear 57. The third-speed gear train G3 includes a third-speed drive idle gear 59 which is carried by the first main shaft 44 for relative rotation with its axial position being constant; and a third-speed driven gear 60 which is joined to the counter shaft 46 so as not to be relatively rotatable and meshes with third-speed drive idle gear 59. The fifth-speed gear train G5 includes a fifth-speed drive gear 61 which is disposed between the first and third drive idle gears 57 and 59 so as to enable axial slide operation and is joined to the first main shaft 44 so as not to be relatively rotatable; and a fifth-speed driven idle gear 62 which is carried by the counter shaft 46 for relative rotation with its axial position being constant and meshes with the fifth-speed drive gear 61.

The second-speed gear train G2 includes a second-speed drive gear 63 provided integrally with the second main shaft 45; and a second-speed driven idle gear 64 which is rotatably carried by the counter shaft 46 with its axial position being constant and meshes with the second-speed drive gear 63. The fourth-speed gear train G4 includes a fourth-speed drive gear 65 provided integrally with the second main shaft 45; and a fourth-speed driven gear 66 which is carried by the counter shaft 46 for relative rotation with its axial position being constant and meshes with the fourth-speed drive gear 65. The reverse-speed gear train GR includes a second-speed drive gear 63; a first reverse idle gear 67 meshing with the second-speed drive gear 63; a second reverse idle gear 68 formed integrally with the first reverse idle gear 67; and a reverse driven idle gear 69 which is carried by the counter shaft 46 for relative rotation with its axial position being constant and meshes with the second reverse idle gear 68. The first and second reverse idle gears 67, 68 formed integrally with each other are journaled by a reverse idle shaft 70 which has an axis parallel to each of the first main shaft 44, the second main shaft 45 and the counter shaft 46 and which is carried at both ends by the crankcase 23.

A ringlike to-be-engaged member 71 is secured to the end of the first-speed drive idle gear 57 close to the third-speed drive idle gear 59. A first shifter 72 is carried between the to-be-engaged member 71 and the third-speed drive idle gear 59 by the first main shaft 44 so as not to be relatively rotatable and to be axially slidable. The fifth-speed drive gear 61 is integrally provided on the first shifter 72. The first shifter 72 is slidable in the axial direction of the first main shaft 44 so as to select one of a position where it is engaged with the to-be-engaged member 71 to establish the first-speed gear train G1, a position where it is engaged with the third-speed drive idle gear 59 to establish the third-speed gear train G3, and an intermediate position where it is not engaged with any one of the first- and second-speed drive idle gears 57, 59 (the neutral state).

The third-speed driven gear 60 of the third-speed gear train G3 is integrally provided on a second shifter 73 which is carried between the fifth-speed driven idle gear 62 and the reverse driven idle gear 69 by the counter shaft 46 so as not to be relatively rotatable and to be axially slidable. The second shifter 73 is slidable in the axial direction of the counter shaft 46 between a position where it is engaged with the fifth-speed driven idle gear 62 and a position where it is engaged with the reverse driven idle gear 69 while maintaining the meshing state of the third-speed drive idle gear 59 with the third driven gear 60. Thus, if the second shifter 73 is engaged with the fifth-speed driven idle gear 62 with the first shifter 72 located at the intermediate position, the fifth-speed gear train G5 is established.

A third shifter 74 is carried between the second-speed driven idle gear 64 and the fourth-speed driven idle gear 66 by the counter shaft 46 so as not to be relatively rotatable and to be axially slidable. The third shifter 74 is slidable in the axial direction of the counter shaft 46 so as to select one of a position where it is engaged with the second-speed driven idle gear 64 to establish the second-speed gear train G2, a position where it is engaged with the fourth-speed driven idle gear 66 to establish the fourth-speed gear train C4 and an intermediate position where it is not engaged with any one of the second- and fourth-speed driven idle gears 64, 66 (the neutral state). Thus, if the second shifter 73 is engaged with the reverse driven idle gear 69 with the first and third shifters 72, 74 located at the intermediate position, the reverse gear train GR is established.

A plurality of first engaging projections 78 are projectingly provided on the end of the first shifter 72 on the side of the to-be-engaged member 71 secured to the first-speed drive idle gear 57 so as to be circumferentially spaced at equal intervals. A plurality of first engaging projections 79 are provided on the to-be-engage member 71 so as to enable engagement with the first engaging projections 78. A plurality of second engaging projections 80 are projectingly provided on the end of the first shifter 72 on the side of the third-speed drive idle gear 59 so as to be circumferentially spaced at equal intervals. A plurality of second engaging projections 81 are provided on the third-speed drive idle gear 59 so as to enable engagement with the second engaging projections 81.

A plurality of third engaging projections 82 are projectingly provided on the end of the second shifter 73 on the side of the fifth-speed driven idle gear 62 so as to be circumferentially spaced at equal intervals. A plurality of third engaging projections 83 are provided on the fifth-speed driven idle gear 62 so as to enable engagement with the third engaging projections 82. A plurality of engaging projections 84 are projectingly provided on the end of the second shifter 73 on the side of the reverse driven idle gear 69 so as to be circumferentially spaced at equal intervals. A plurality of fourth engaging projections 85 are provided on the reverse driven idle gear 69 so as to enable engagement with the fourth engaging projections 84.

A plurality of fifth engaging projections 86 are projectingly provided on the end of the third shifter 74 on the side of the second driven idle gear 64 so as to be circumferentially spaced at equal intervals. A plurality of fifth engaging projections 87 are provided on the second-speed driven idle gear 64 so as to enable engagement with the fifth engaging projections 86. A plurality of engaging projections 88 are projectingly provided on the end of the third shifter 74 on the side of the four-speed driven idle gear 66 so as to be circumferentially spaced at equal intervals. A plurality of sixth engaging projections 89 are provided on the fourth-speed driven idle gear 66 so as to enable engagement with the sixth engaging projections 88.

Figure 4:
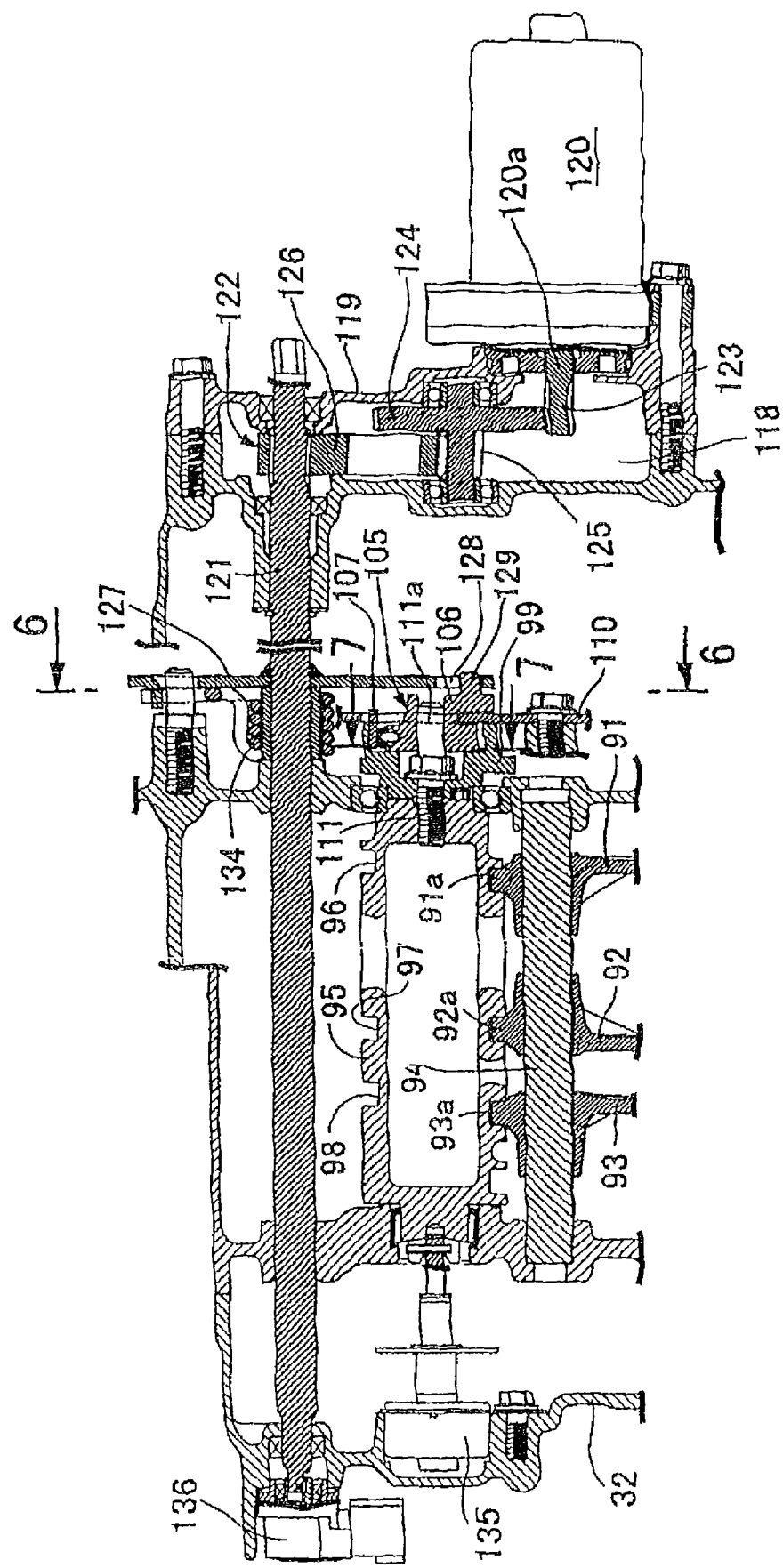
FIG. 4 is a cross-sectional view taken along line 4-4 of FIG. 2.

Referring additionally to FIG. 4, the first, second and third shifters 72, 73 and 74 are rotatably held by first, second and third shift forks 91, 92 and 93, respectively. The shift forks 91 to 93 have respective axial lines parallel to each of the first and second main shafts 44, 45 and the counter shaft 46 and are carried slidably in the axial direction of a shift fork shaft 94 by the shift fork shaft 94 supported by the crankcase 23. A shift drum 95 having an axis parallel to each of the first and second main shafts 44, 45 and the counter shaft 46 is carried by the crankcase 23 so as to be turnable around the axis. Shift pins 91a, 92a and 93a provided to project from the first, second and third shift forks 91, 92 and 93, respectively, are slidably engaged with first, second and third lead grooves 96, 97 and 98, respectively. If the shift drum 95 is turned, the first, second and third shift forks 91, 92 and 93 are axially and slidably moved according to the patterns of the first, second and third lead grooves 96, 97 and 98, respectively.

Figure 5:
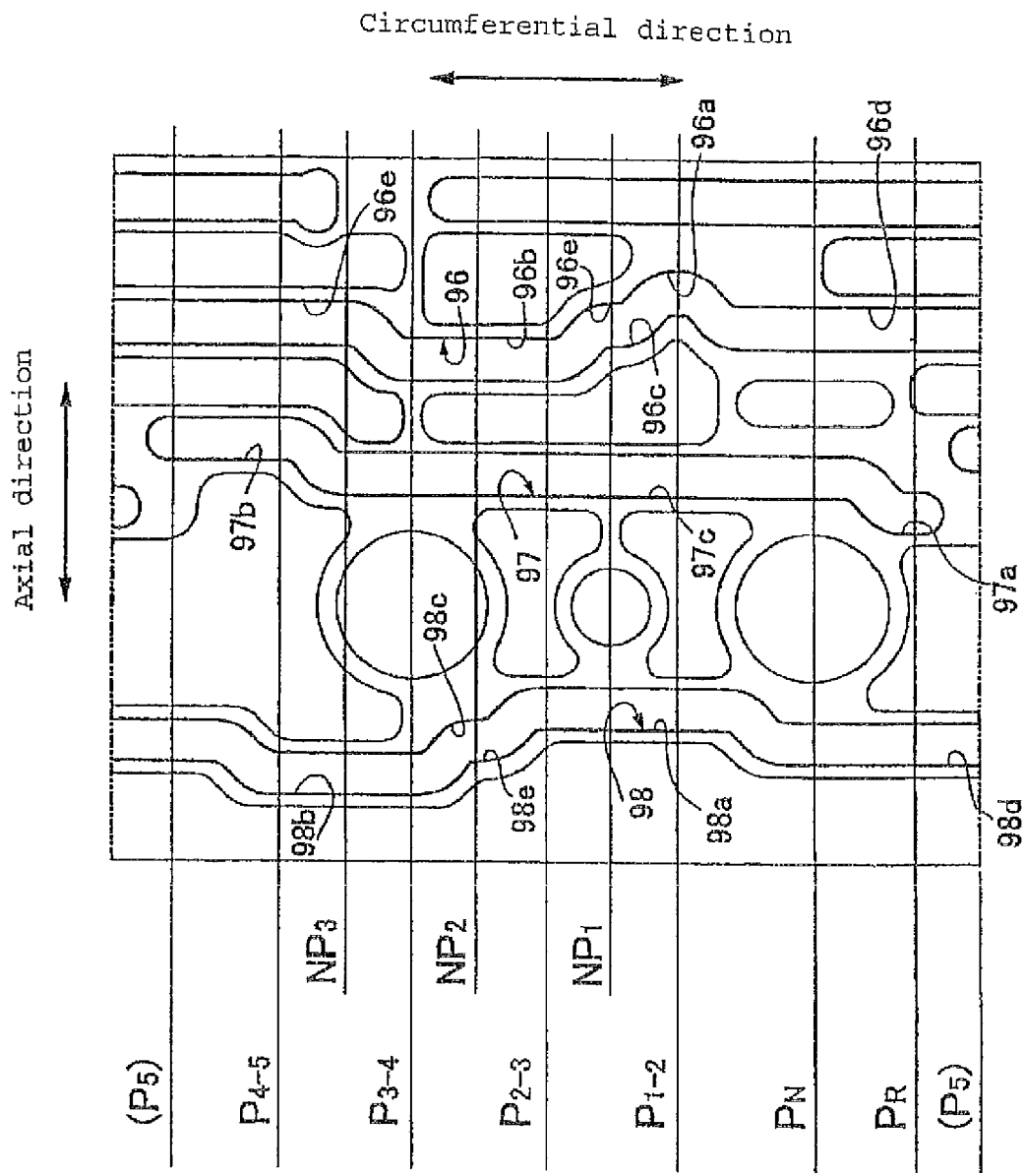
FIG. 5 is a development view of the outer circumferential surface of a shift drum.

Referring to FIG. 5, the first lead groove 96 is adapted to guide the slide operation of the first shift fork 91 holding the first shifter 72. The first lead groove 96 is provided along the entire circumference of the shift drum 95 to have a first-speed gear train establishing portion 96a, a third-speed gear train establishing portion 96b, a communication portion 96c and an intermediate-position portion 96d. The first-speed gear train establishing portion 96a extends in the circumferential direction of the shift drum 95 so as to bring the first shifter 72 into engagement with the to-be-engaged member 71 secured to the first-speed drive idle gear 57. The third-speed gear train establishing portion 96b extends in the circumferential direction of the shift drum 95 at a position offset from the first-speed gear train establishing portion 96a in the axial direction of the shift drum 95 so as to bring the first shifter 72 into engagement with the third-speed drive idle gear 59.

The communication portion 96c connects the first- and third-speed gear train establishing portions 96a, 96b. The intermediate-position portion 96d is adapted to retain the first shifter 72 at the intermediate position. At the central portion of the communication portion 96c, the neutral portion 96e is formed to slightly extend in the circumferential direction of the shift drum 95 so as to retain the first shifter 72 at a position adapted to release engagement with each of the first- and third-speed driving idle gears 57, 59.

The second lead groove 97 is adapted to guide the slide operation of the second shift fork 92 holding the second shifter 73 and has a reverse gear train establishing portion 97a, a fifth-speed gear train establishing portion 97b and an intermediate-position portion 97c. The reverse gear train establishing portion 97a extends in the circumferential direction of the shift drum 95 so as to bring the second sifter 97a into engagement with the reverse driven idle gear 69. The fifth gear train establishing portion 97b extends in the circumferential direction of the shift drum 95 at a position offset from the reverse gear train establishing portion 97a in the axial direction of the shift drum 95 so as to bring the second shifter 73 into engagement with the fifth-speed driven idle gear 62. The intermediate-position portion 97c is adapted to retain the second shifter 73 at the intermediate position. The second lead groove 97 is provided on the outer circumference of the shift drum 95 so as to extend less than one cycle thereof. The reverse gear train establishing portion 97a and the fifth-speed gear train establishing portion 97b are respectively disposed at both ends of the second lead grove 97.

The third lead groove 98 is adapted to guide the slide operation of the third shift fork 93 holding the third shifter 74, The third lead groove 98 is provided along the entire circumference of the shift drum 95 to have a second-speed gear train establishing portion 98a, a fourth-speed gear train establishing portion 98b, a communication portion 98c and an intermediate-position portion 98d. The second-speed gear train establishing portion 98a extends in the circumferential direction of the shift drum 95 so as to bring the third shifter 74 into engagement with the second-speed driven idle gear 64. The fourth-speed gear train establishing portion 98b extends in the circumferential direction of the shift drum 95 at a position offset from the second-speed gear train establishing portion 98a in the axial direction of the shift drum 95 so as to bring the third shifter 74 into the engagement with the fourth-speed drive idle gear 66.

The communication portion 98c connects the second- and fourth-speed gear train establishing portions 98a, 98b. The intermediate-position portion 98d is adapted to retain the third shifter 74 at the intermediate position. At the central portion of the communication portion 98c, the neutral portion 98e is formed to slightly extend in the circumferential direction of the shift drum 95 so as to retain the first shifter 72 at a position adapted to release engagement with the second- and fourth-speed driving idle gears 64, 66.

Incidentally, a reverse position $P_R$, a neutral position $P_N$, a first- and second-speed position $P_{1-2}$, a second- and third-speed position $P_{2-3}$, a third- and fourth-speed position $P_{3-4}$, a fourth- and fifth-speed position $P_{4-5}$ and a filth-speed position $P_5$ are sequentially set on the shift drum 95 so as to be spaced apart from each other.

In this way, at the reverse position $P_R$, the respective shift pins 91a, 93a of the first and third shift forks 91, 93 are brought into engagement with the respective intermediate positions 96d, 98d of the first and third lead grooves 96d, 98d, respectively, and the shift pin 92a of the second shift fork 92 is brought into engagement with the reverse gear train establishing portion 97a of the second lead groove 97, thereby establishing the reverse gear train GR. At the neutral position $P_N$, the respective shift pins 91a, 92a and 93a of the first, second and third shift forms 91, 92 and 93 are brought into engagement with the respective intermediate-position portions 96d, 97c and 98d of the first, second and third lead grooves 96, 97 and 98, respectively, thereby bringing any one of the gear trains G1 through G5 and GR into non-establishment.

At the first- and second-speed position $P_{1-2}$, the shift pin 91a of the first shift fork 91 is brought into engagement with the first-speed gear train establishing portion 96a of the first lead groove 96, the shift pin 92a of the second shift fork 92 is brought into engagement with the intermediate-position portion 97c of the second lead groove 97 and the shift pin 93a of the third shift fork 93 is brought into engagement with the second-speed gear train establishing portion 98a of the third lead groove 98, thereby establishing both the first and second gear trains G1, G2.

At the second- and third-speed position $P_{2-3}$, the shift pin 91a of the first shift fork 91 is brought into engagement with the third-speed gear train establishing portion 96b of the first lead groove 96, the shift pin 92a of the second shift fork 92 is brought into engagement with the intermediate-position portion 97c of the second lead groove 97 and the shift pin 93a of the third shift fork 93 is brought into engagement with the second-speed gear train establishing portion 98a of the third lead groove 98, thereby establishing both the second and third gear trains G2, G3.

At the third- and fourth-speed position $P_{3-4}$, the shift pin 91a of the first shift fork 91 is brought into engagement with the third-speed gear train establishing portion 96b of the first lead groove 96, the shift pin 92a of the second shift fork 92 is brought into engagement with the intermediate-position portion 97c of the second lead groove 97 and the shift pin 93a of the third shift fork 93 is brought into engagement with the fourth-speed gear train establishing portion 98b of the third lead groove 98, thereby establishing both the third and fourth gear trains G3, G4.

At the fourth- and fifth-speed position $P_{4-5}$, the shift pin 91a of the first shift fork 91 is brought into engagement with the intermediate-position portion 96d of the first lead groove 96, the shift pin 92a of the second shift fork 92 is brought into engagement with the fifth-speed gear train establishing portion 97b of the second lead groove 97 and the shift pin 93a of the third shift fork 93 is brought into engagement with the fourth-speed gear train establishing portion 98b of the third lead groove 98, thereby establishing both the fourth and fifth gear trains G4, G5.

At the fifth-speed position $P_5$, the shift pin 91a of the first shift fork 91 is brought into engagement with the intermediate-position portion 96d of the first lead groove 96, the shift pin 92a of the second shift fork 92 is brought into engagement with the fifth-speed gear train establishing portion 97b of the second lead groove 97 and the shift pin 93a of the third shift fork 93 is brought into engagement with the intermediate-position portion 98d of the third lead groove 98, thereby establishing only the fifth-speed gear train G5.

In short, at the time of upshift, a gear train with a higher-speed stage can preliminarily be established before switching to the higher-speed stage. At the time of downshift, a gear train with a lower-speed stage can preliminarily be established before switching to the lower-speed stage. During running at the most frequently used fifth-speed, only the fifth-speed gear train G5 is established.

Incidentally, a 1-3 neutral position $NP_1$ which is a neutral position encountered when the establishing states of the first-speed gear train G1 and the third-speed gear train G3 provided between the first main shaft 44 and the counter shaft 46 are switched is set at the central portion, along the circumferential direction of the shift drum 95, between the first- and second-speed position $P_{1-2}$ and the second- and third-speed position $P_{2-3}$.

The neutral portion 96e of the first lead groove 96 is disposed at the 1-3 neutral position $NP_1$. A 2-4 neutral position $NP_2$ which is a neutral position encountered when the establishing states of the second-speed gear train G2 and fourth-speed gear train G4 provided between the second main shaft 45 and the counter shaft 46 are switched is set at the central portion, along the circumferential direction of the shift drum 95, between the second- and third-speed position $P_{2-3}$ and the third- and fourth-speed position $P_{3-4}$.

The neutral portion 98e of the third lead groove 98 is disposed at the 2-4 neutral position $NP_2$. A 3-5 neutral position $NP_3$ which is a neutral position encountered when the establishing states of the third-speed gear train G3 and the fifth-speed gear train G5 provided between the first main shaft 44 and the counter shaft 46 are switched is set at the central portion, along the circumferential direction of the shift drum 95, between the third- and fourth-speed position $P_{3-4}$ and the fourth- and fifth-speed position $P_{4-5}$.

Figure 6:
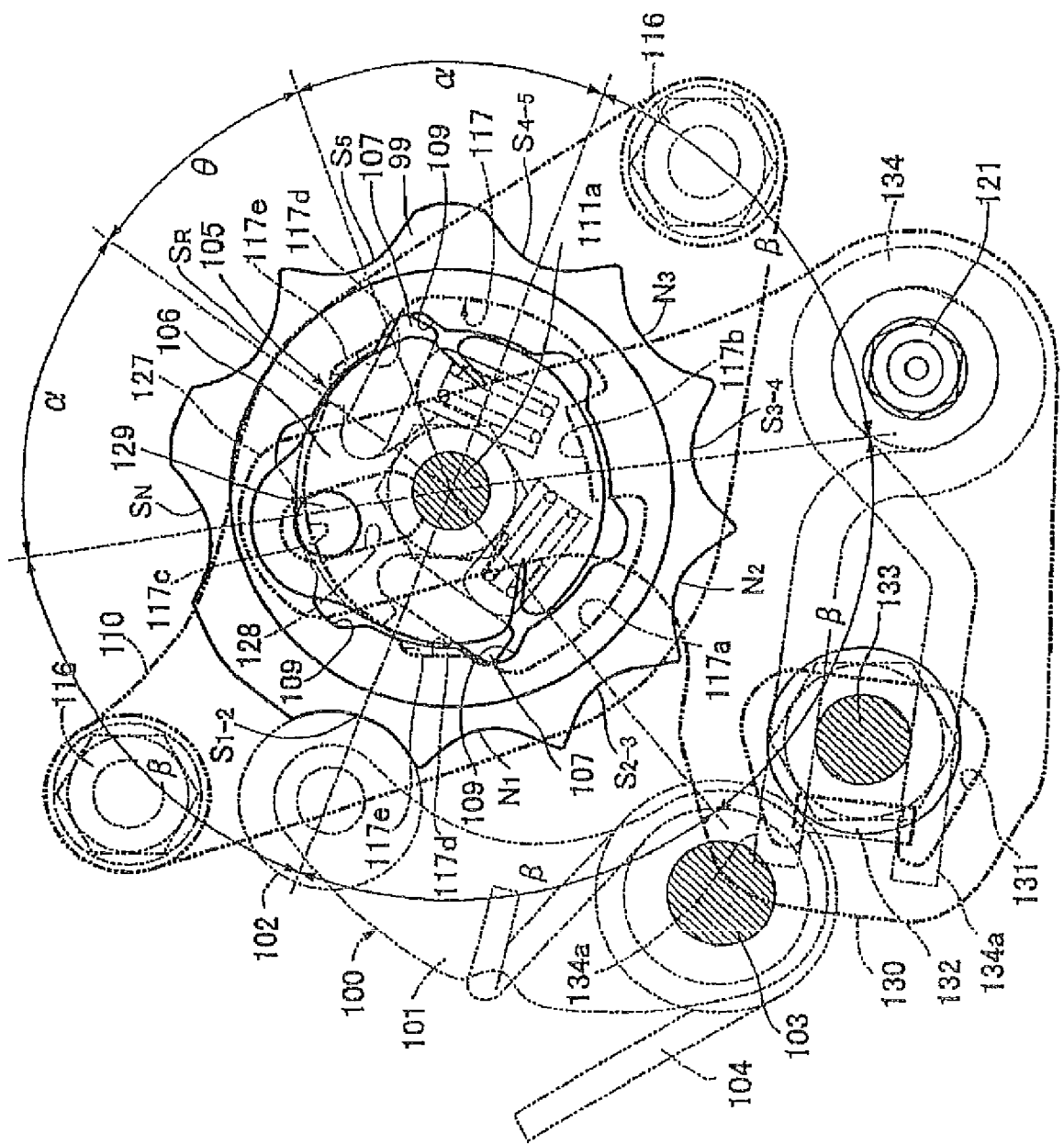
FIG. 6 is an enlarged cross-sectional view of FIG. 4 in a first-speed driving state.
Figure 7:
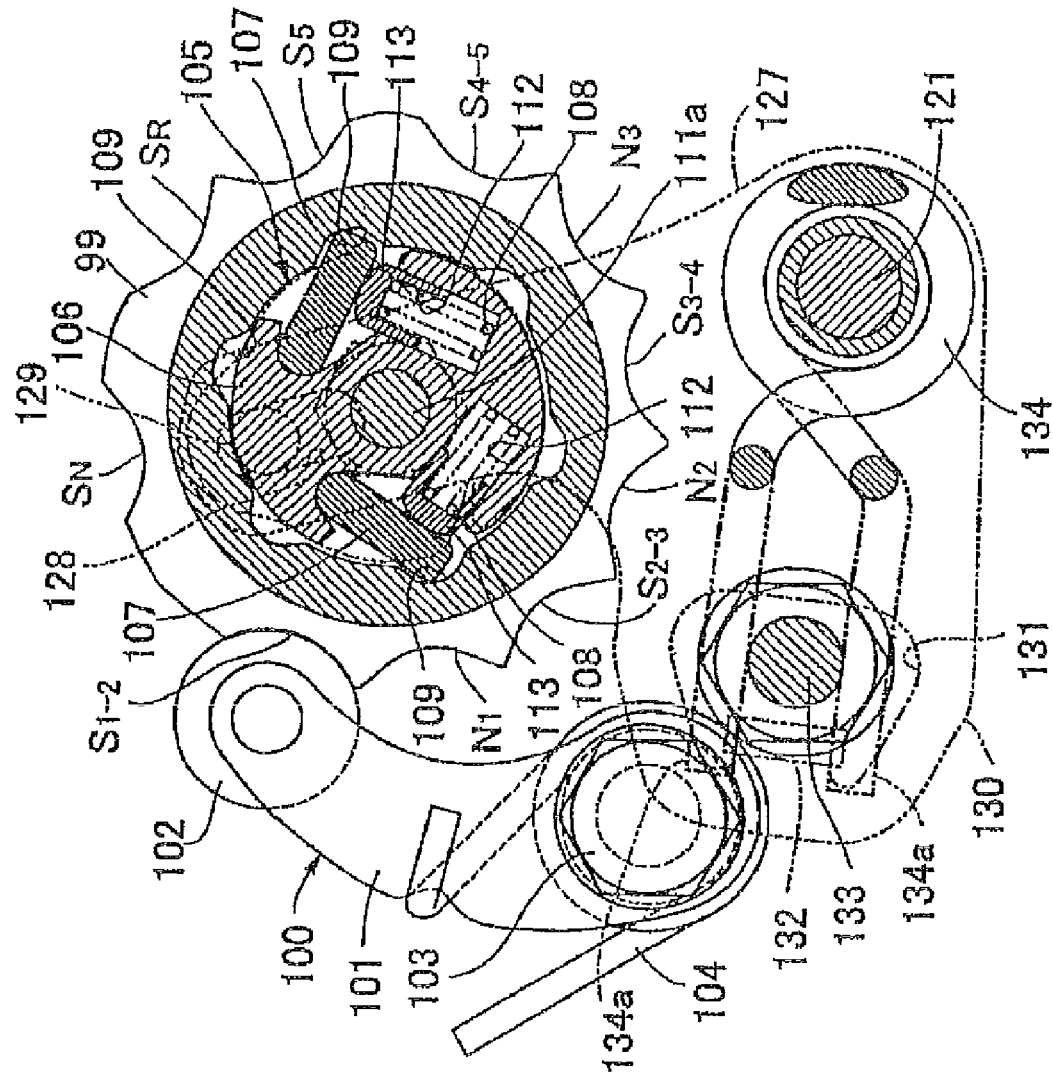
FIG. 7 is an enlarged cross-sectional view taken along line 7-7 of FIG. 4 in the first-speed driving state.

Referring additionally to FIGS. 6 and 7, a shift drum center 99 turning together with the shift drum 95 is secured to one end of the shift drum 95 with a bolt 111 coaxial therewith. The shift drum center 99 is formed on its outer circumference with a reverse positioning notch $S_R$, a neutral positioning notch $S_N$, a first- and second-speed positioning notch $S_{1-2}$, a second- and third-speed positioning notch $S_{2-3}$, a third- and fourth-speed positioning notch $S_{3-4}$, a fourth- and fifth-speed positioning notch $S_{4-5}$ and a fifth-speed positioning notch $S_5$ which are spaced apart from each other and correspond respectively to the reverse position $P_R$, the neutral position $P_N$, the first- and second speed position $P_{1-2}$, the second- and third-speed position $P_{2-3}$, the third- and fourth-speed position $P_{3-4}$, the fourth- and fifth-speed position $P_{4-5}$ and the fifth-speed position $P_5$ which are set on the shift drum 95 to selectively establish the first- through fifth-speed gear trains G1 through G5 and reverse gear trains GR.

Of the positioning notices $S_R$, $S_N$, $S_{1-2}$, $S_{2-3}$, $S_{3-4}$, $S_{4-5}$ and $S_5$, the notches, namely, the neutral positioning notch $S_N$, the first- and second speed positioning notch $S_{1-2}$, the second- and third-speed positioning notch $S_{2-3}$, the third- and fourth-speed positioning notch $S_{3-4}$, the fourth- and fifth-speed positioning notch $S_{4-5}$, excluding at least two notches, namely, the reverse positioning notch $S_R$ and fifth-speed positioning notch $S_5$, are spaced at equal intervals.

On the other hand, the reverse positioning notch $S_R$ and fifth-speed positioning notch $S_5$ are spaced at an interval different from the respective intervals between the neutral positioning notch $S_N$ and the first- and second speed positioning notch $S_{1-2}$, between the first- and second speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, and between the third- and fourth-speed positioning notch $S_{3-4}$ and the fourth- and fifth-speed positioning notch $S_{4-5}$. In addition, the reverse positioning notch $S_R$ and fifth-speed positioning notch $S_5$ are arranged to be spaced from other respective notches adjacent thereto in the circumferential direction of the shift drum center 99, that is, from the neutral positioning notch $S_N$ and from the fourth- and fifth-speed positioning notch $S_{4-5}$, respectively.

In this embodiment, the respective intervals β between the neutral positioning notch $S_N$ and the first- and second speed positioning notch $S_{1-2}$, between the first- and second speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, and between the third- and fourth-speed positioning notch $S_{3-4}$ and the fourth- and fifth-speed positioning notch $S_{4-5}$ are set equally to each other at 60 degrees.

On the other hand, the interval θ between the reverse positioning notch $S_R$ and fifth-speed positioning notch $S_5$ is set at 30 degrees, which is smaller than 60 degrees. The respective intervals α between the neutral positioning notch $S_N$ adjacent to the reverse positioning notch $S_R$ in the circumferential direction of the shift run center 99 and the reverse positioning notch $S_R$ and between the fourth- and fifth-speed positioning notch $S_{4-5}$ adjacent to the fifth-speed positioning notch $S_5$ in the circumferential direction of the shift run center 99 and the fifth-speed positioning notch $S_5$ are set at 45 degrees, which is smaller than 60 degrees.

Thus, the reverse position $P_R$ and fifth-speed position $P_5$ which are shift positions corresponding respectively to the reverse positioning notch $S_R$ and fifth-speed positioning notch $S_5$ which are the particular positioning notches are set on the shift drum 95 so as to correspond respectively to both the ends of the second lead groove 97 which extends less than one cycle of the shift drum 95 in the circumferential direction of the shift drum 95.

In addition, neutral notches $N_1$, $N_2$ and $N_3$ corresponding respectively to the 1-3 neutral position $NP_1$, 2-4 neutral position $NP_2$ and 3-5 neutral position $NP_3$ are provided on the outer circumference of the shift drum center 99 at the respective central portion-s between the first- and second speed position $P_{1-2}$ and the second- and third-speed position $P_{2-3}$, between the second- and third-speed position $P_{2-3}$ and the third- and fourth-speed position $P_{3-4}$, and between the third- and fourth-speed position $P_{3-4}$ and the fourth- and fifth-speed position $P_{4-5}$.

A drum stopper arm 100 is selectively engaged with each of the notches $S_R$, $S_N$, $S_{1-2}$, $S_{2-3}$, $S_{3-4}$, $S_{4-5}$, $S_5$, $N_1$, $N_2$, and $N_3$ provided on the shift drum center 99. The drum stopper arm 100 includes an arm 101 and a roller 102. The arm 101 is pivotally supported at its proximal end by the case half body 23a of the crankcase 23 by use of a support shaft 103 having an axis parallel to the respective axes of the shift drum 95 and the shift drum center 99. The roller 102 is rotatably supported by the end of the arm 102 so as to be engaged with each of the notches $S_R$, $S_N$, $S_{1-2}$, $S_{2-3}$, $S_{3-4}$, $S_{4-5}$, $S_5$, $N_1$, $N_2$, and $N_3$. In addition, the notches $S_R$, $S_N$, $S_{1-2}$, $S_{2-3}$, $S_{3-4}$, $S_{4-5}$, $S_5$, $N_1$, $N_2$, and $N_3$ are formed in an arcuate concave to stabilize the engaging state of the roller 102.

A torsion spring 104 is provided between the proximal end of the arm 101 and the case half body 23a. The arm 101, i.e., the drum stopper arm 100 is biased toward the turning center of the shift drum center 99 by a spring force exerted by the torsion spring 104 to bring the roller 102 into engagement with one of the notches $S_R$, $S_N$, $S_{1-2}$, $S_{2-3}$, $S_{3-4}$, $S_{4-5}$, $S_5$, $N_1$, $N_2$, and $N_3$.

The shift drum center 99 is intermittently turned and driven by a predetermined angle (60 degrees in the embodiment) by drive means 105. The drive means 105 includes a drum shifter 106, a pair of poles 107, 107, a pair of springs 108, 1083 engaging recess portions 109, 109, a stationary guide plate 110 and a shift operation motor 120. The drum shifter 106 has at least one portion disposed in the shift drum center 99 so as to enable turning around its axis coaxial with the shift drum center 99. The poles 107, 107 are symmetrically attached to the drum shifter 106 so as to rise and fall in the radial direction of the drum shifter 106. The springs 108, 108 bias the respective polls 107 in the rising direction. The engaging recess portions 109 are provided in the inner circumference of the shift drum center 99 at circumferentially equal intervals so as to enable engagement with the associated poles 107. The guide plate 110 guides the rising or falling state of the poles 107 according to the turning of the drum shifter 106. The shift operation motor 120 applies a turning force to the drum shifter 106.

The drum shifter 106 is supported by a shaft portion 111a so as to be turnable around its axis coaxial with the shift drum center 99. The shaft portion 111a is part of and coaxial with the bolt 111 coaxially connected to one end of the shift drum 95. The drum shifter 106 has a part protruding outwardly from the shift drum center 99 and the most part disposed within the shift drum center 99 for relative rotation.

The springs 108 are each compressedly provided between the closed end of a housing recess portion 112 provided on the outer circumferential portion of the drum shifter 106 and a bottomed cylindrical lifter 113 which is slidably fitted into the housing recess portion 112 so as to be abutted against the leading end of the pole 107. Thus, the poles 107 are each biased by the spring 108 in a rising direction. When the pole 107 rises, its leading end projects from the outer circumference of the drum shifter 106. When the pole 107 falls, the leading end positionally, approximately coincides with the outer circumference of the drum shifter 106.

The shift drum center 99 is provided on its inner circumference with the plurality of (six in the embodiment) engaging recess portions 109. While the drum stopper arm 100 is engaged with one of the reverse positioning notch $S_R$, the neutral positioning notch $S_N$, the first- and second-speed positioning notch $S_{1-2}$, the second- and third-speed positioning notch $S_{2-3}$, the third- and fourth-speed positioning notch $S_{3-4}$, the fourth- and fifth-speed positioning notch $S_{4-5}$, and the fifth-speed notch $S_5$, the leading ends of the poles 107 can selectively be engaged with two engaging recess portions 109, 109 located to put two other engaging recess portions 109, 109, therebetween, of the engaging recess portions 109.

The guide plate 110 is fastened to the case half body 23a with a pair of bolts 116, 116 at a position where the shift drum center 99 is put between the case half body 23a of the crankcase 23 and the guide plate 110. The guide plate 110 is provided with a guide hole 117 corresponding to the drum shifter 106.

The guide hole 117 includes a large-diameter circular arc portion 117a, a restrictive projection 117b, a small-diameter circular arc portion 117c and connecting portions 117d, 117d. The large-diameter circular arc portion 117a is formed to extend around the turning axes of the shift drum center 99 and drum shifter 106, i.e., the axis of the shaft portion 111a and to have a diameter greater than the outer circumference of the drum shifter 106. The restrictive projection 117b projects inward of the outer circumference of the drum shifter 106 from the central portion of the large-diameter circular arc portion 117a.

The small-diameter circular arc portion 117c is formed to extend around the axis of the shaft portion 111a and have a diameter smaller than the outer circumference of the drum shifter 106. One of the connecting portions 117d, 117d connects one end of the large-diameter circular arc portion 117a with one end of the small-diameter circular arc portion 117c and the other connects the other end of the large-diameter circular arc portion 117a with the other end of the small-diameter circular arc portion 117c. The circumferential length of the large diameter circular arc portion 117a is set to a length corresponding to that between the two engaging recess portions 109 engaged respectively with the leading ends of both the poles 109.

The connecting portions 117d are each formed at its central portion with a step portion 117e. The step portion 117e is abutted against the pole 107 to push it to the falling side when the poles 107 engaged with the engaging recess portion 109 is moved toward the small-diameter circular arc portion 117c in response to the turning of the drum shifter 106. The step portions 117e are disposed outward of the inner circumference of the shift drum center 99.

The restrictive projection 117b is formed to be abutted against the leading end of one of the poles 107 to restrict the turning of the drum shifter 106 in response to one operation of the drum shifter 106 which is temporarily stopped during the operation, according to the operation of the shift operation motor 120 which is temporarily stopped during the operation.

Focusing on FIG. 4, a cover 119 is fastened to the first crankcase cover 31 so as to form a reduction gear housing chamber 118 therebetween. The shift operation motor 120 is mounted to the cover 119. The shift operation motor 120 has a rotational axis parallel to the shift drum 95. The shift operation motor 120 is mounted to the cover 119 in such a manner that its output shaft 120a projects into the reduction gear mechanism housing chamber 118. On the other hand, a change shaft 121 having an axis parallel to the shift drum 95 is disposed to turnably pass through the first crankcase cover 31, through the cover 119 and through the second crankcase cover 32. A reduction gear mechanism 122 is housed in the reduction gear mechanism housing chamber 118 so as to be disposed between the output shaft 120a and the change shaft 121.

The reduction gear mechanism 122 includes a drive gear 123 provided in the reduction gear mechanism housing chamber 118 integrally with the output shaft 120a of the shift operation motor 120; a first intermediate gear 124 meshing with the drive gear 123; a second intermediate gear 125 rotating integrally with the first intermediate gear 124; and a driven sector gear 126 secured to one end of the change shaft 121 in the reduction gear mechanism housing chamber 118 and meshing with the second intermediate gear 125. The rotational power of the shift operation motor 120 is reduced in speed by the reduction gear mechanism 122 and transmitted to the change shaft 121.

A change arm 127 is secured at its proximal end to the change shaft 121 so as to extend in the radial direction of the change shaft 121 toward the drum shifter 106. The change arm 127 lengthwise extending in the radial direction of the change shaft 121 is provided with a long-hole-like engaging hole 128. An engaging pin 129 which is implanted in the drum shifter 106 at a position offset from the rotational axis of the drum shifter 106 is engaged with the engaging hole 128.

An arm 130 extending in the radial direction of the change arm 127 is provided integrally with the proximal end of the change arm 127 so as to form an approximately L-shape along with the change aim 127. The arm 130 is formed at its leading end with an arcuate long-hole around the axis of the change shaft 121. In addition, a projecting portion 132 is provided to be located on a straight line connecting the circumferential center of the long-hole 131 with the axis of the change shaft 121.

On the other hand, a pin 133 is implanted in the case half body 23a of the crankcase 23 so as to be inserted into the long-hole 131. A griping spring 134 is disposed between the change arm 127 and arm 130, and the case half body 23a of the crankcase 23 so as to surround the change shaft 121. The griping spring 134 has at both ends a pair of gripping arms 134a, 134a gripping the projecting portion 132 and the pin 134 from both sides. Thus, the change arm 127 and the arm 130 is biased to a neutral position where the projecting portion 132 and the pin 133 are lined with each other on the straight line connecting the circumferential center of the long-hole 131 and with the axis of the change shaft 121.

Now, a description is made of a case of upshift to the second-speed from the driving state at the first-speed, namely, from the case where the drum stopper arm 100 is engaged with the first- and second-speed positioning notch $S_{1-2}$ of the shift drum center 99, the first hydraulic clutch 52 is engaged and the second hydraulic clutch 53 is disengaged. The change shaft 121 and change arm 127 are turned clockwise in FIG. 6 in response to the operation of the shift electric motor 120. Since the engaging pin 129 is engaged with the long-hole 128 of the change arm 127, the drum shifter 106 of the drive means 105 is turned clockwise in FIG. 6 while the engaging pin 129 is displaced in the engaging hole 128 toward the change shaft 121.

Thus, one of the poles 107, 107 engaged respectively with the two engaging recess portions 109, 109 is turned around the axis of the shaft portion 111 along a portion, of the guide hole 117 of the guide plate 110, corresponding to the large-diameter circular arc portion 117a, thereby pressing and turning the shift drum center 99 clockwise in FIG. 6.

Figure 8:
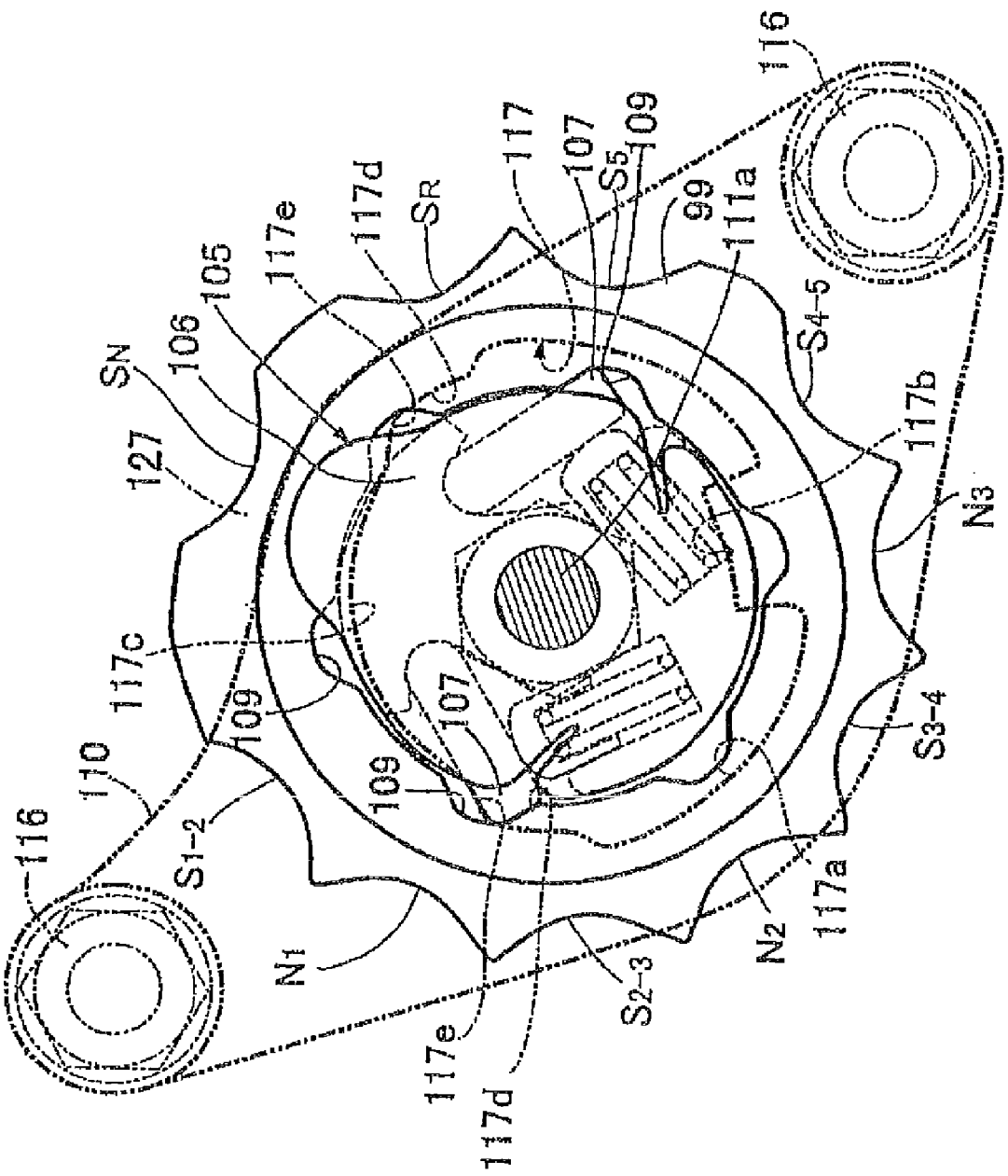
FIG. 8 illustrates a state of a portion of drive means encountered in the middle of the turning of a shift drum center.

When drivingly turned in this way, the shift drum 95 may precedently be turned in some cases. In this case, as shown in FIG. 8, the gear trains G1 through G5, GR are in a non-establishment state, the other of the poles 107, 107 (one of them which does not press the shift drum center 99) is abutted against the step portion 117e at the intermediate portion of the connecting portion 117d of the guide hole 117 to bring the other pole 107 into abutment against and into engagement with the engaging recess portion 109. This will stop the precedent turn of the shift drum 95.

Figure 9:
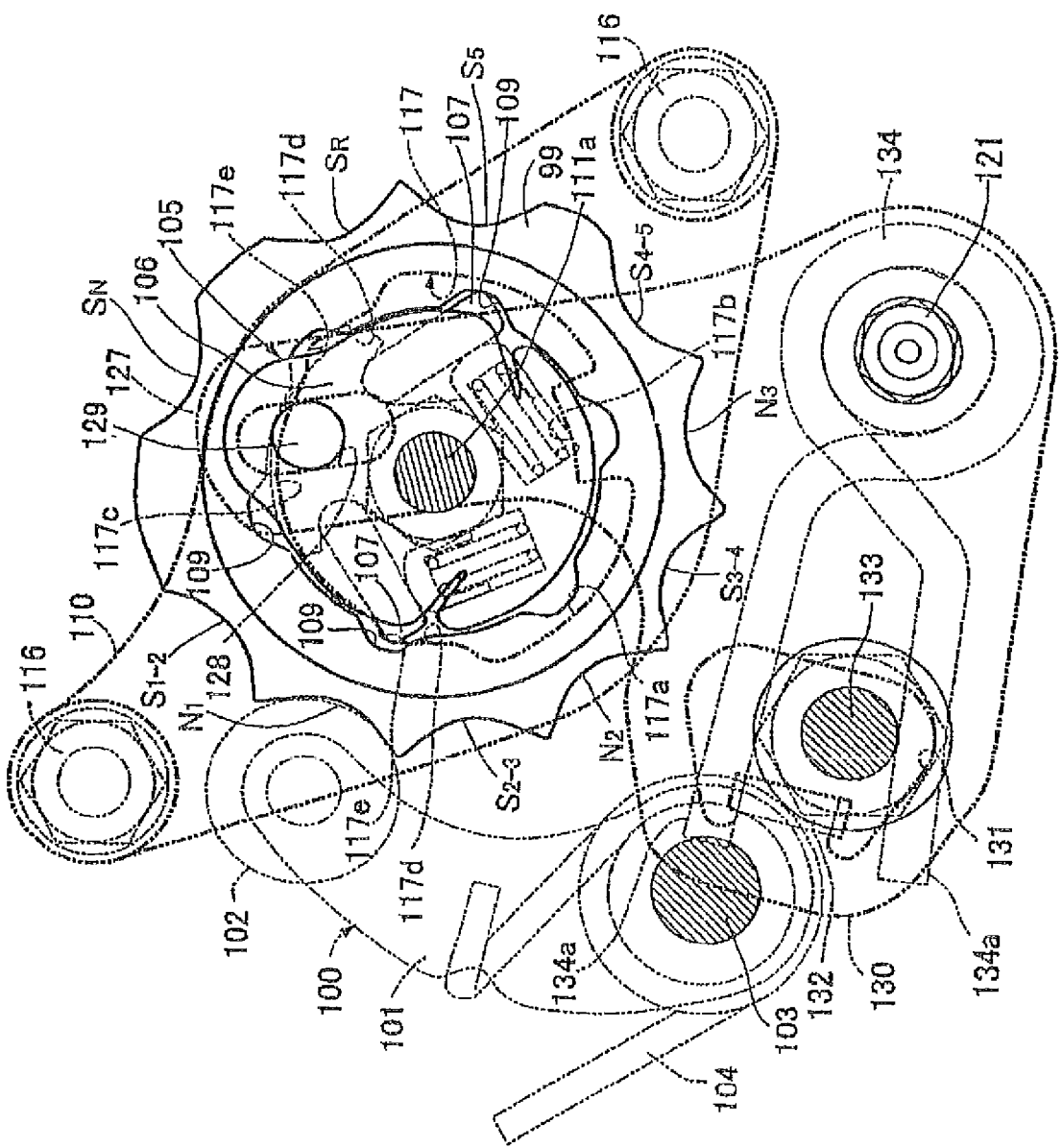
FIG. 9 is an enlarged cross-sectional view, corresponding to FIG. 6, illustrating a state of the middle of upshift from the first-speed to the second-speed.

In this state, as shown in FIG. 9, the roller 102 of the drum stopper arm 100 gets over the mountain between the first- and second-speed positioning notch $S_{1-2}$ and the neutral notch $N_1$ and engages the neutral notch $N_1$, whereby the neutral position of the shift drum 95 can accurately be provided. If the drum shifter 106 is further turned, the other pole 107 is turned so as to be inwardly folded by the step portion 117e, whereby the roller 102 of the drum stopper arm 100 gets over the mountain between the neutral notch $N_1$ and the second- and third-speed notch $S_{2-3}$.

Figure 10:
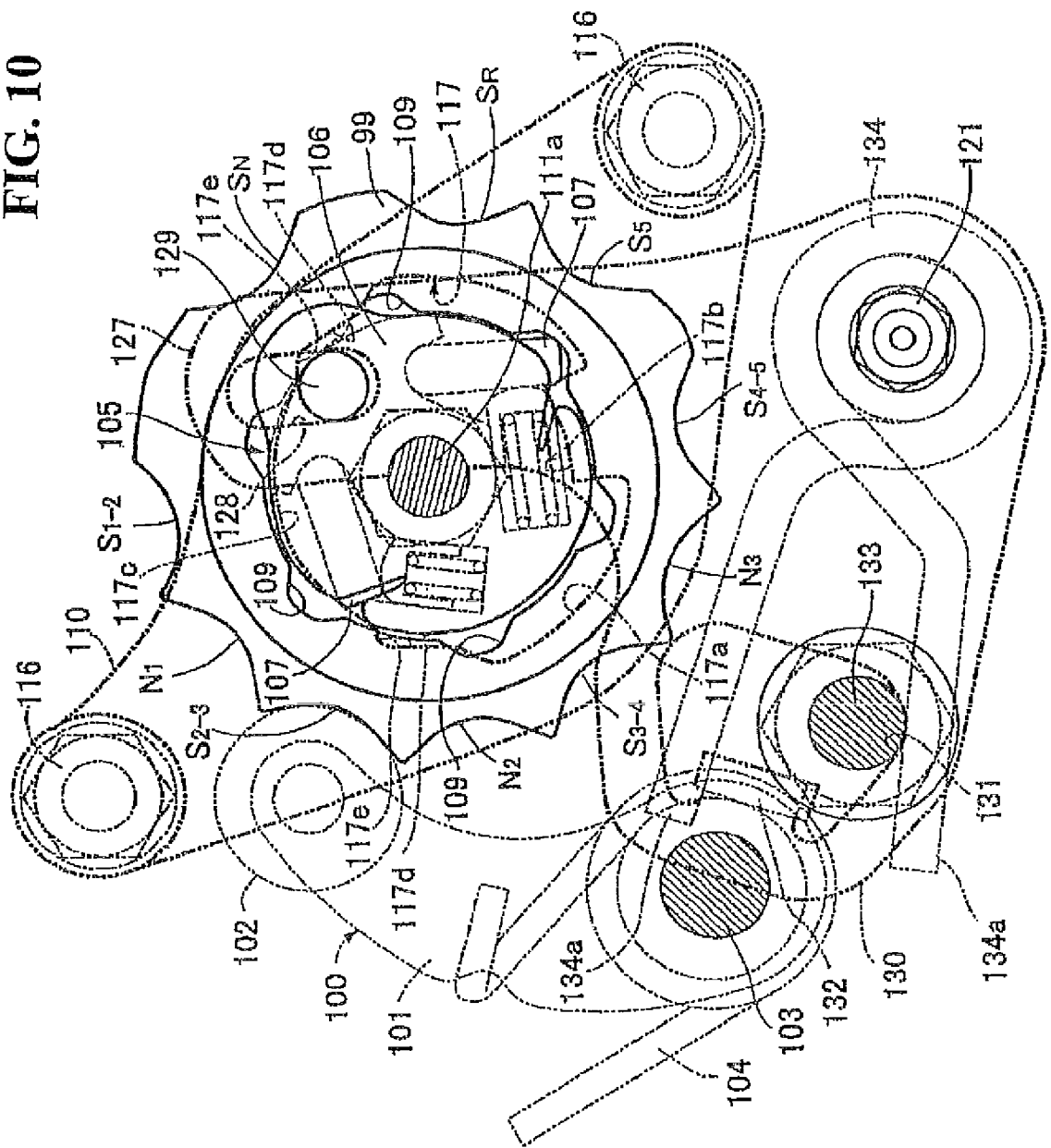

The further turn of the drum shifter 106 allows the leading end of the other pole 107 to come into slidable contact with the small-diameter circular arc portion 117c of the guide hole 117 of the guide plate 110. When the drum shifter 106 is turned until the roller 102 gets over the mountain between the neutral notch N, and the second- and third-speed notch $S_{2-3}$, the operation of the shift electric motor 120 is stopped. As shown in FIG. 10, the shift drum center 99 is turned until the roller 102 of the drum stopper arm 100 is engaged with the second- and third-speed notch $S_{2-3}$. In other words, the shift electric motor 120 is only needed to provide power to turn the drum shifter 106 by less than 60 degrees, e.g., 53.7 degrees, which corresponds to all interval between the first- and second-speed positioning notch $S_{1-2}$ and the second- and third-speed positioning notch $S_{2-3}$.

As described above, the drive means 105 temporarily moderately lowers the rotational speed of the shift drum 95 in the middle of the upshift from the first-speed to the second-speed. Such operation of the drive means 105 applies to upshift from the second-speed to the third-speed, to upshift from the third-speed to the fourth-speed, to upshift from the four-speed to the fifth-speed, to downshift from the fifth-speed to the fourth-speed, to downshift from the fourth-speed to the third-speed, to downshift from the third-speed to the second-speed and to downshift from the second-speed to the first-speed.

In addition, the roller 102 of the drum stopper arm 100 is engaged with the reverse positioning notch $S_R$, with the neutral positioning notch $S_N$, with the first- and second-speed positioning notch $S_{1-2}$, with the second- and third-speed positioning notch $S_{2-3}$, with the third- and fourth-speed positioning notch $S_{3-4}$, with the fourth- and fifth-speed positioning notch $S_{4-5}$, and with the fifth-speed notch $S_5$, and the turning of the shift drum 95 is stopped. Thereafter, the change arm 127 is returned to the position shown in FIGS. 6 and 7 by the spring force of the gripping spring 134 and also the drum shifter 106 is returned to the position shown in FIGS. 6 and 7.

The turning angle of the shift drum 95 is detected by a drum turning angle detector 135, which is connected to the other end of the shift drum 95 and mounted to the second crankcase cover 32. The turning angle of the change shaft 121 is detected by a change shaft turning angle detector 136, which is connected to the other end of the change shaft 121 and mounted to the second crankcase cover 32.

Figure 11:
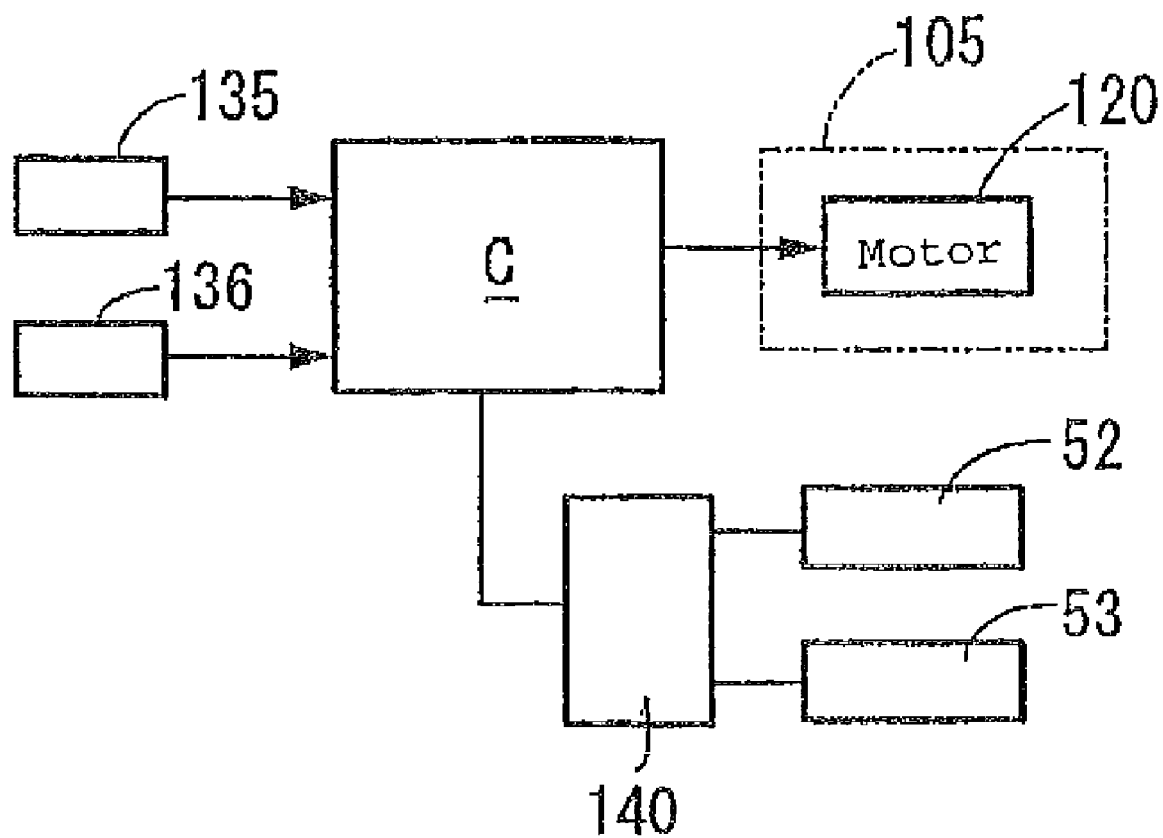
FIG. 11 is a flowchart illustrating a configuration of a control system.

Referring to FIG. 11, the shift operation motor 120 of the driving means 105 is controlled by a control unit C in response to the detection values of the turning angle detector 135 and change shaft turning angle detector 136. The control unit C controls the operation of a hydraulic controller 140 which switches engagement/disengagement of the first and second hydraulic clutches 52, 53. The control unit C controls the operation of the shift operation motor 120 and engagement/disengagement switching of the first and second hydraulic clutches 52, 53.

At the time of upshift from the state of ruining at the fourth-speed lower, by one stage, than the highest shift stage by disengagement of the first hydraulic clutch 52 and by engagement of the second hydraulic clutch 53, the control unit C turns the shift drum 95 to the fifth-speed position $P_5$ to release the establishment of the fourth-speed gear train 64 at the time of running at the fifth-speed obtained by engagement of the first hydraulic clutch 52 and by disengagement of the second hydraulic clutch 53. In addition, at the time of downshift from the running at the fifth-speed in the state where the first hydraulic clutch 52 is engaged and the second hydraulic clutch 53 is disengaged, the control unit C turns the shift drum 95 to the fourth- and fifth-speed position $P_{4-5}$ to establish both the fourth-speed and fifth-speed gear trains G4, G5 and thereafter disengages the first hydraulic clutch 52 and engages the second hydraulic clutch 53.

A description is next made of the operation of the embodiment. The first shifter 72 turning together with the first main shaft 44 is slid to the side to release the engagement with one of the first-speed drive idle gear 57 and third-speed drive idle gear 59 located on both sides of the first shifter 72 and engage the other and the third sifter 74 turning together with the counter shaft 46 is slid to the side to release the engagement with one of the second-speed driven idle gear 64 and four-speed driven idle gear 66 located on both sides of the third shifter 74 and engage the other. At this time, the first and third shift forks 91, 93 are guided by the neutral portions 96e, 98e, respectively, which are formed, so as to extend in the circumferential direction of the shift drum 95, at the respective central portions of the respective communication portions 96e, 98e of the first and third lead grooves 96, 98 provided on the outer circumference of the shift drum 95. Thus, it is possible to delay the engaging timing of the first and third shifters 72, 74 with the other of the first-speed drive idle gear 57 and third-speed drive idle gear 59, and of the second-speed driven idle gear 64 and fourth-speed driven idle gear 66 with respect to the turning of the shift drum 95, as compared with a shift drum having linear communication portions.

In addition, the plurality of positioning notches $S_{1-2}$, $S_{2-3}$, $S_{3-4}$ and $S_{4-5}$, and $S_5$, are provided on the outer circumference of the shift drum center 99 so as to be spaced apart from each other to establish a gear train selected from the gear trains G1 through G5 by bringing the drum upper aim 100 into selective engagement therewith. In addition, the neutral notches $N_1$, $N_2$, $N_3$ are provided to be disposed at the central portions between the positioning notches $S_{1-2}$ and $S_{2-3}$, between positioning notches $S_{2-3}$ and $S_{3-4}$, and between the positioning notches $S_{3-4}$ and $S_{4-5}$, respectively, and to enable engagement with the drum stopper arm 100. Since the turning resistance acting on the drum shifter 106 from the drum stopper arm 100 is temporarily increased in the middle of the establishment of the gear train, the turning speed of the shift drum 95, namely, the slide speed of the first, second and third shifters 72, 73, 74 can temporarily be reduced.

Speed differences between the first shifter 72 and the gear adapted to bring the first shifter 72 into engagement and between the third shifter 74 and the gear adapted to bring the third shifter 74 into engagement are relatively reduced along with the functions of the neutral portions 96e, 98e which are respectively formed at the central portions of the communication portions 96c, 98c of the lead grooves 96, 98. This more effectively prevents the engagement sound from being increased.

The first shifter 72 turning with the first main shaft 44 is slid to the side to release the engagement with one of the first-speed drive idle gear 57 and third-speed drive idle gear 59 located on both sides of the first shifter 72 and engage the other in the state where power transmission from the engine E to the first main shaft 44 is interrupted and the power from the engine E is transmitted to the second main shaft 45. At this time, the first shift fork 91 is guided by the neutral portion 96f which is formed at the central portion of the connection portion 96c of the first lead groove 96 provided on the outer circumference of the shift drum 95 so as to extend in the circumferential direction of the shift drum 95. Thus, the engaging timing of the first shifter 72 with both the idle gears 57, 59 can be delayed with respect to the turning of the shift drum 95. The turning of the shift drum 95 is temporarily stopped in the middle thereof by the guide plate 110 bringing the pole 107 into engagement with the engaging recess portion 109.

In addition, the turning of the shift drum center 99 is temporarily stopped in the middle thereof by bringing the drum stopper arm 100 into the neutral notch $N_1$ on the outer circumference of the shift drum 99. Thus, in the state where both the idle gears 57, 59 are turned by the establishment of the second-speed gear train 62 provided between the second main shaft 45 and the counter shaft 46, a relative rotation speed difference can relatively be reduced between the idle gears 57, 59 and the first shifter 72 resulting from the turning of the first main shaft 44 dragged by the viscosity of the lubricating oil filled between the needle bearings 48 provided between the first and second main shafts 44, 45 or by the viscosity of the lubricating oil between the first hydraulic clutch 52 and the transmission cylindrical shaft 49. This can prevent increased engagement sound.

The third shifter 74 turning along with the counter shaft 46 is slid to the side to release the engagement with one of the second-speed driven idle gear 64 and fourth-speed driven idle gear 66 located on both sides of the third shifter 74 and engage the other in the state where power transmission from the engine E to the second main shaft 45 is interrupted and the power from the engine E is transmitted to the first main shaft 44. At this time, the third shift fork 93 is guided by the neutral portion 98f which is formed at the central portion of the connection portion 98c of the third lead groove 98 provided on the outer circumference of the shift drum 95 so as to extend in the circumferential direction of the shift drum 95. Thus, the engaging timing of the third shifter 74 with the idle gears 64, 66 can be delayed with respect to the turning of the shift drum 95. The turning of the shift drum center 99 is temporarily stopped in the middle thereof by the turning resistance of the guide plate 110 and by the engagement of the drum stopper arm 100 with the neutral notch $N_2$ formed on the outer circumference of the shift drum center 99.

Thus, in the state where the counter shaft 46 and the third shifter 74 are turned by the establishment of the third-speed gear train G3 provided between the first main shaft 44 and the counter shaft 46, a relative rotation speed difference can relatively be reduced between the third shifter 74 and the idle gears 64, 66 resulting from the turning of the second main shaft 45 dragged by the viscosity of the lubricating oil filled between the needle bearings 48 provided between the first and second main shafts 44, 45 or by the viscosity of the lubricating oil between the second hydraulic clutch 53 and the transmission cylindrical shaft 49. This can more effectively prevent increased engagement sound.

Of the plurality of positioning notches $S_N$, $S_{1-2}$, $S_{2-3}$, $S_{3-4}$, $S_{4-5}$, $S_5$, and $S_R$ provided on the outer circumference of the shift drum center 99, the notches, namely, the neutral positioning notch $S_N$, the first- and second speed positioning notch $S_{1-2}$, the second- and third-speed positioning notch $S_{2-3}$, the third- and fourth-speed positioning notch $S_{3-4}$, the fourth- and fifth-speed positioning notch $S_{4-5}$, excluding at least two particular positioning notches, the reverse positioning notch $S_R$ and fifth-speed positioning notch $S_5$, are spaced at equal intervals. On the other hand, the reverse positioning notch $S_R$ and fifth-speed positioning notch $S_5$ are spaced at an interval different from the respective intervals between the neutral positioning notch $S_N$ and the first- and second speed positioning notch $S_{1-2}$, between the first- and second speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, and between the third- and fourth-speed positioning notch $S_{3-4}$ and the fourth- and fifth-speed positioning notch $S_{4-5}$. In addition, the reverse positioning notch $S_R$ and fifth-speed position $P_5$ are arranged to be spaced from other respective notches adjacent thereto in the circumferential direction of the shift drum center 99, that is, from the neutral positioning notch $S_N$ and front the fourth- and fifth-speed positioning notch $S_{4-5}$, respectively. Thus, the number of shift stages can be increased while maintaining the shapes of the lead grooves 96, 97, 98 as much as possible and avoiding enlargement of the shift drum 95.

The respective intervals between the neutral positioning notch $S_N$ and the first- and second speed positioning notch $S_{1-2}$, between the first- and second speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, and between the third- and fourth-speed positioning notch $S_{3-4}$ and the fourth- and fifth-speed positioning notch $S_{4-5}$ are set equally to each other at 60 degrees. On the other hand, the interval θ between the reverse positioning notch $S_R$ and fifth-speed positioning notch $S_5$ is set at 30 degrees, which is smaller than 60 degrees. In addition, the reverse positioning notch $S_R$ and the fifth-speed positioning notch $S_5$ are provided on the shift drum center 99 so as to correspond to both the ends of the second lead groove 97 extending less than one cycle of the shift drum 95 in the circumferential direction of the shift drum. Thus, the shift position corresponding to the reverse positioning notch $S_R$ and fifth-speed positioning notch $S_5$ having the small interval therebetween is abutted against both the ends of the lead groove, thereby more reliably establishing the shift stage.

The respective intervals α between the neutral positioning notch $S_N$ adjacent to the reverse positioning notch $S_R$ in the circumferential direction of the shift drum center 99 and reverse positioning notch $S_R$ and between the fourth- and fifth-speed positioning notch $S_{4-5}$ adjacent to the fifth-speed positioning notch $S_5$ in the circumferential direction of the shift drum center 99 and fifth-speed positioning notch $S_5$ are set at intervals smaller than the respective intervals between the neutral positioning notch $S_N$ and the first- and second speed positioning notch $S_{1-2}$, between the first- and second speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, and between the third- and fourth-speed positioning notch $S_{3-4}$ and the fourth- and fifth-speed positioning notch $S_{4-5}$. At the reverse position $P_R$ and fifth-speed position $P_5$ corresponding respectively to the reverse positioning notch $S_R$ and fifth-speed positioning notch $S_5$, the shift pin 92a is abutted against both the ends of the second lead groove 97 to prevent the turning of the shift drum 95, thereby more reliably establishing the shift stage.

The respective intervals between the reverse positioning notch $S_R$ and the neutral positioning notch $S_N$ adjacent to the reverse positioning notch $S_R$ in the circumferential direction of the shift drum center 99 and between the fifth-speed positioning notch $S_5$ and the fourth- and fifth-speed positioning notch $S_{4-5}$ adjacent to the fifth-speed positioning notch 85 in the circumferential direction of the shift drum center 99 are set at intervals smaller than the respective intervals between the neutral positioning notch $S_N$ and the first- and second speed positioning notch $S_{1-2}$, between the first- and second speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, and between the third- and fourth-speed positioning notch $S_{3-4}$ and the fourth- and fifth-speed positioning notch $S_{4-5}$. Thus, the shift stage can more reliably be established.

In addition, the drive means 105 is provided with the shift operation motor 120 and configured to convert the rotational power of the shift operation motor 120 to the turning power of the drum stopper arm 100. Thus, it is easy to change the transfer amount of the shift drum center 99 by the shift operation motor 120 so as to correspond to the associated shift positions. Even if the interval between the shift positions is small, the shift drum center 99 can reliably be transferred to a desired shift position.

Further, in the running state of using the fifth-speed gear train G5 that is a particular gear train with the highest frequency of the established states among the gear trains G1 though G5, GR, the gear trains excluding the fifth-speed gear train G5 are in the non-established state. Thus, during running at the most frequently used fifth-speed, it is possible to suppress occurrence of gear rattle at the gear trains other than the fifth-speed gear train G5 with such a gear shift stage.

The fifth-speed position $P_5$ that establishes only the fifth-speed gear train G5 corresponding to the fifth-speed and the fourth- and fifth-speed position that establishes both the fourth-speed gear train and the fifth-speed gear train G5 corresponding to the fourth-speed lower, by one stage, than the fifth-speed are set adjacently to each other in the circumferential direction of the shift drum 95. Thus, with the simple configuration, only the fifth-speed gear train G5 can be established during running at the fifth-speed and both the fifth-speed gear train G5 and fourth-speed gear train G4 can be established during running at the fourth-speed.

The control unit C which controls the operation of the drive means 105 turning the shift drum 95 and the engagement/disengagement switching of the first and second hydraulic clutches 52, 53, at the time of upshift from the state of running at the fourth-speed lower, by one stage, than the highest shift stage by disengagement of the first hydraulic clutch 52 and by engagement of the second hydraulic clutch 53, allows the shift drum 95 to be turned to the fifth-speed position P5 to release the establishment of the fourth-speed gear train G4 during running at the fifth-speed resulting from the engagement of the first hydraulic clutch 52 and from the disengagement of the second hydraulic clutch 3.

In addition, at the time of downshift from the running at the fifth-speed in the state where the first hydraulic clutch 52 is engaged and the second hydraulic clutch 53 is disengaged, the control unit C allows the shift drum 95 to be turned to the fourth- and fifth-speed position $P_{4-5}$ to establish both the fourth-speed gear train 64 and fifth-speed gear train G5, then disengages the first hydraulic clutch 52 and engages the second hydraulic clutch 53. Thus, the shift operation between the fifth-speed and the fourth-speed can be made satisfactory.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle transmission comprising:
   first and second main shafts that enable switching of power transmission from an engine;
   a counter shaft connected to a drive wheel;
   a plurality of gear trains with a plurality of shift stages provided between each of the first and second main shafts and the counter shaft; and
   multiple shifters which switch between engagement with and disengagement from a gear constituting part of each of the plurality of gear trains so as to switch established states of the each of the gear trains;
   wherein in a running state of using a particular one of gear trains having a highest frequency of an established state among the gear trains, the gear trains, excluding the particular gear train, are in a non-established state.

2. The vehicle transmission according to claim 1, further comprising:
   a shift drum in which shift positions of a plurality of shift stages are set to be circumferentially spaced from each other; and
   shift forks holding the respective shifters;
   wherein an outer circumference of the shift drum is provided with lead grooves that are adapted to receive respective the shift forks, the shift forks slidably engaging with the lead grooves, and
   wherein the shift position for a highest shift stage that establishes only the particular gear train corresponding to the highest shift stage, and a common shift position that establishes both the particular gear train, and a lower speed stage side gear train corresponding to a shift stage that is lower by one stage than the highest shift stage, are set adjacently to each other in a circumferential direction of the shift drum.

3. The vehicle transmission according to claim 2, further comprising:
   a first clutch provided between the engine and the first main shaft,
   a second clutch provided between the engine and the second main shaft,
   the particular gear train being provided between the first main shaft and the counter shaft, and the low-speed stage side gear train being provided between the second main shaft and the counter shaft,
   the vehicle transmission further comprising:
   drive means connected to the shift drum; and
      a control unit adapted to control operation of the drive means during turning of the shift drum and engagement/disengagement switching of the first and second hydraulic clutches, at the time of upshift from a state of running at a speed that is lower by one stage than the highest shift stage by disengagement of the first hydraulic clutch and by engagement of the second hydraulic clutch, and
   the control unit allowing the shift drum to be turned to a shift position for the highest shift stage to release the establishment of the lower-speed side gear train during running at the highest shift stage resulting from the engagement of the first hydraulic clutch and from the disengagement of the second hydraulic clutch, and at the time of downshift from running at the highest shift stage in the state of the engagement of the first clutch and of the disengagement of the second clutch, and
   the control unit allowing the shift drum to turn to the common shift position to establish both the low-speed stage side gear train and the particular gear train, after which the control unit then disengages the first clutch and engages the second clutch.

4. The vehicle transmission according to claim 1, wherein the first main shaft coaxially passes through the second main shaft for relative rotation which is journaled by a crankcase housing the engine and the transmission.

5. The vehicle transmission according to claim 2, where the lead grooves on the outer circumference of the shift drum include a first, second and a third lead groove, wherein each of the first and third lead grooves is provided along an entire circumference of the shift drum, and the second lead groove includes has two closed ends.

6. The vehicle transmission according to claim 5, wherein the first lead groove includes establishing positions for a first-speed gear train and a third-speed gear train of the plurality of gear trains.

7. The vehicle transmission according to claim 5, wherein the third lead groove includes establishing positions for a second-speed gear train and a fourth-speed gear train of the plurality of gear trains.

8. The vehicle transmission according to claim 5, wherein the second lead groove includes establishing positions for a fifth-speed gear train and a reverse gear train of the plurality of gear trains.

9. The vehicle transmission according to claim 1, wherein the plurality of gear trains includes a fourth-speed gear train and a fifth-speed gear train, and only the fifth-speed gear train is in the established state during running at a fifth-speed, whereby it is possible to suppress all occurrence of gear rattle of others of the plurality of gear trains.

10. The vehicle transmission according to claim 1, wherein the plurality of gear trains includes a fourth-speed gear train and a fifth-speed gear train, and both of the fifth-speed gear train and fourth-speed gear train are in the established state during running at a fourth-speed.

11. A vehicle transmission comprising:
   first and second main shafts that enable switching of power transmission from an engine;
   a counter shaft connected to a drive wheel;
   first- to fifth-speed gear trains and a reverse gear train with a plurality of shift stages provided between each of the first and second main shafts and the counter shaft; and
   three shifters which switch between engagement with and disengagement from a gear constituting part of each of the gear trains so as to switch established states of the each of the gear trains;
   wherein in a running state of using a particular one of gear trains having a highest frequency of an established state among the gear trains, the gear trains, excluding the particular gear train, are in a non-established state.

12. The vehicle transmission according to claim 11, further comprising:
   a shift drum in which shift positions of a plurality of shift stages are set to be circumferentially spaced from each other; and
   three shift forks holding the three respective shifters;
   wherein outer circumference of the shift drum is provided with three lead grooves that are adapted to receive respective the three shift forks, each of the shift forks slidably engaging with one of the lead grooves, and wherein the shift position for highest shift stage that establishes only the particular gear train corresponding to the highest shift stage, and a common shift position that establishes both the particular gear train, and a lower speed stage side gear train corresponding to a shift stage that is lower by one stage than the highest shift stage, are set adjacently to each other in a circumferential direction of the shift drum.

13. The vehicle transmission according to claim 12, further comprising:

a first clutch provided between the engine and the first main shaft, a second clutch provided between the engine and the second main shaft, the particular gear train being provided between the first main shaft and the counter shaft, and the low-speed stage side gear train being provided between the second main shaft and the counter shaft, the vehicle transmission further comprising:

drive means connected to the shift drum; and a control unit adapted to control operation of the drive means during turning of the shift drum and engagement/disengagement switching of the first and second hydraulic clutches, at the time of upshift from a state of running at a speed that is lower by one stage than the highest shift stage by disengagement of the first hydraulic clutch and by engagement of the second hydraulic clutch, and the control unit allowing the shift drum to be tuned to a shift position for the highest shift stage to release the establishment of the lower-speed side gear train during running at the highest shift stage resulting from the engagement of the first hydraulic clutch and from the disengagement of the second hydraulic clutch, and at the time of downshift from running at the highest shift stage in the state of the engagement of the first clutch and of the disengagement of the second clutch, and the control unit allowing the shift drum to turn to the common shift position to establish both the low-speed stage side gear train and the particular gear train, after which the control unit then disengages the first clutch and engages the second clutch.

14. The vehicle transmission according to claim 11, wherein the first main shaft coaxially passes through the second main shaft for relative rotation which is journaled by a crankcase housing the engine and the transmission.

15. The vehicle transmission according to claim 12, where the lead grooves on the outer circumference of the shift drum include a first, a second, and a third lead groove, wherein each of the first and third lead grooves is provided along an entire circumference of the shift drum, and the second lead groove includes has two closed ends.

16. The vehicle transmission according to claim 15, wherein the first lead groove includes establishing positions for the first-speed gear train and the third-speed gear train.

17. The vehicle transmission according to claim 15, wherein the third lead groove includes establishing positions for the second-speed gear train and the fourth-speed gear train.

18. The vehicle transmission according to claim 15, wherein the second lead groove includes establishing positions for a fifth-speed gear train and a reverse gear train.

19. The vehicle transmission according to claim 11, wherein only the fifth-speed gear train is in the established state during running at a fifth-speed, whereby it is possible to suppress an occurrence of gear rattle of others of the gear trains.

20. The vehicle transmission according to claim 11, wherein both of the fifth-speed gear train and fourth-speed gear train are in the established state during running at a fourth-speed.

* * * * *